United States Patent
Koike et al.

(10) Patent No.: US 8,699,611 B2
(45) Date of Patent: Apr. 15, 2014

(54) WIRELESS COMMUNICATIONS SYSTEM AND APPARATUS

(75) Inventors: Chimato Koike, Kawasaki (JP); Daisuke Ogawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/419,089

(22) Filed: Mar. 13, 2012

(65) Prior Publication Data
US 2012/0170627 A1 Jul. 5, 2012

Related U.S. Application Data

(63) Continuation of application No. PCT/JP2009/066074, filed on Sep. 15, 2009.

(51) Int. Cl.
*H04L 1/02* (2006.01)
*H04B 7/02* (2006.01)

(52) U.S. Cl.
USPC .......................................................... 375/267

(58) Field of Classification Search
USPC .................. 375/259, 260, 267, 295, 316, 299
See application file for complete search history.

(56) References Cited

U.S. PATENT DOCUMENTS

| | | | |
|---|---|---|---|
| 2006/0172704 A1 | 8/2006 | Nishio et al. | |
| 2008/0268862 A1* | 10/2008 | Kent et al. | 455/452.2 |
| 2009/0060074 A1 | 3/2009 | Sandell | |
| 2009/0147880 A1 | 6/2009 | Wennstrom et al. | |
| 2010/0002643 A1* | 1/2010 | Han et al. | 370/329 |

FOREIGN PATENT DOCUMENTS

| | | |
|---|---|---|
| CA | 2655757 | 1/2008 |
| EP | 1643669 | 4/2006 |
| EP | 2031814 | 3/2009 |
| GB | 2452319 | 3/2009 |
| JP | 2007110664 | 4/2007 |
| JP | 2009004921 | 1/2009 |
| JP | 2009060615 | 3/2009 |
| WO | 2005015797 | 2/2005 |
| WO | 2008009157 | 1/2008 |

OTHER PUBLICATIONS

Khaled et al, Interpolation-Based Multi-Mode Precoding for MIMO-OFDM Systems with Limited Feedback; IEEE Transactions on Wireless Communications, vol. 6, No. 3, Mar. 2007.*
International Search Report issued for Application No. JP2009066074 mailed Oct. 13, 2009 with English Translation.

(Continued)

*Primary Examiner* — Kevin M Burd
(74) *Attorney, Agent, or Firm* — Myers Wolin, LLC

(57) ABSTRACT

In a wireless communication apparatus, an index value control unit transmits, to a different wireless communication apparatus, index values which indicate precoding matrices for use in precoding of the different wireless communication apparatus, and a deprecoding unit performs deprecoding using precoding matrices corresponding to index values transmitted in the past, wherein the index value control unit transmits, at each transmission timing, the index values generated based on a result of channel condition measurement for entire or some sub-frequency bands of a predetermined frequency band, the count of the index values being less than that of the entire sub-frequency bands, and the deprecoding unit selects one of the index values transmitted in the past, according to the time or frequency of a data block for which no index value is transmitted, and performs deprecoding for the data block using the selected index value.

15 Claims, 19 Drawing Sheets

(56) References Cited

OTHER PUBLICATIONS

Interpolation-Based Multi-Mode Precoding for MIMO-OFDM Systems with Limited Feedback article issued by IEEE Transactions on Wireless Communications, vol. 6, No. 3, dated Mar. 2007.

3rd Generation Partnership Project Technical Specification Group Radio Access Network; Evolved Universal Terrestrial radio Access (E-UTRA); Physical Channels and Modulation, (Release 8), No. 3GPP TS 36.211 V8.5.0 (Dec. 2008).

3rd Generation Partnership Project Technical Specification Group Radio Access Network; Evolved Universal Terrestrial Radio Access (E-UTRA); Multiplexing and channel coding, (Release 8), No. 3GPP TS 36.212 V8.5.0 (Dec. 2008).

3rd Generation Partnership Project Technical Specification Group Radio Access Network; Evolved Universal Terrestrial Radio Access (E-UTRA); Physical Layer procedures, (Release 8), No. 3GPP TS 36.213 V8.5.0 (Dec. 2008).

3rd Generation Partnership Project Technical Specification Group Radio Access network; Evolved Universal Terrestrial Radio Access (E-UTRA); Physical layer procedures, (Release 8), No. 3GPP TS 36.213 V8.7.0 (May 2009).

Catt, "Discussion on precoding granularity for downlink MIMO", Agenda Item: 15.6, Aug. 24-28, 2009, R1-093541, 3GPP TSG RAN WG1 Meeting #58, Shenzhen, China.

LG Electronics, "Frequency granularity of CQI and PMI feedback", Agenda Item: 7.2.4, Aug. 20-24, 2007, R1-073491, 3GPP TSG RAN WG1 #50, Athens, Greece.

Alcatel-Lucent Shanghai Bell et al., "Coherent Time-Frequency Precoding for the non-codebook based TDD DL transmission", Agenda Item: 15.6, Aug. 24-28, 2009, R1-093370, 3GPP TSG RAN WG1 #58, Shenzhen, China.

Japanese Patent Office Action issued for corresponding Japanese Patent Application No. 2011-531675, issued Mar. 19, 2013 with partial English translation.

* cited by examiner

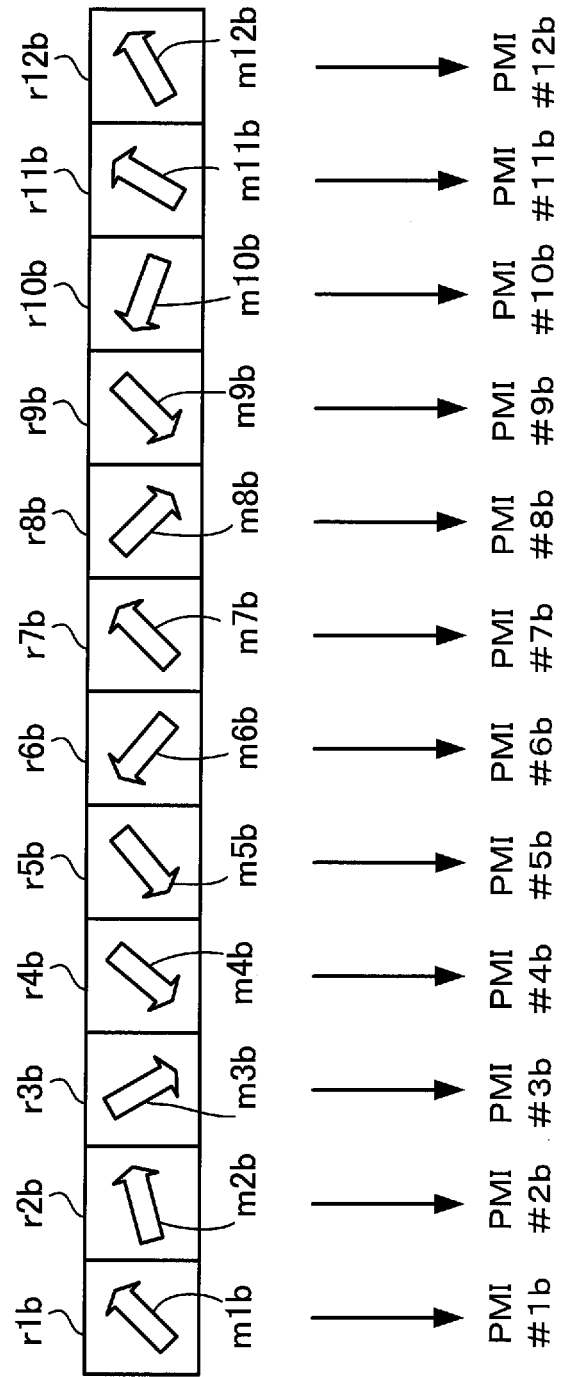

WIRELESS COMMUNICATIONS SYSTEM AND APPARATUS

CROSS-REFERENCE TO RELATED APPLICATION

This application is a continuing application, filed under 35 U.S.C. §111(a), of International Application PCT/JP2009/066074, filed on Sep. 15, 2009, now pending, the contents of which are herein wholly incorporated by reference.

FIELD

The embodiments discussed herein are related to wireless communications systems and wireless communication apparatuses for performing wireless communication. The wireless communications systems include, for example, mobile communication systems, and the wireless communication apparatuses include, for example, mobile apparatuses.

BACKGROUND

In recent years, multiple-input multiple-output (MIMO) transmission systems for performing spatial multiplexing transmission using multiple transmitting and receiving antennas have gained much attention in wireless communication. In addition, in MIMO transmission, precoding techniques have been introduced in order to improve performance of the reception. Precoding is a process performed by a transmitter side for generating transmission signals to be transmitted from multiple transmitting antennas in such a manner that the transmission signals are easily identified on a receiver side. In this case, precoding is implemented by performing linear processing in which original transmission signals are multiplied by precoding matrices.

Regarding the conventional technology, precoding technology has been proposed in which a downlink overhead is reduced (see, for example, Japanese Laid-open Patent Publication No. 2009-4921). In addition, another proposed precoding technology is to provide a minimum bit error rate in the case where most likelihood detection is used (see, for example, Japanese Laid-open Patent Publication No. 2007-110664).

An optimal precoding matrix to be used in the multiplication of a transmission signal changes depending on the condition of a channel (propagation channel) between the transmitter and the receiver. For this reason, the transmitter prepares multiple different precoding matrices in advance, and receives, from the receiver side, feedback notification of an index value which indicates a precoding matrix to be used according to the channel condition. The index value pertaining to the precoding matrix is called a precoding matrix indicator (PMI).

Conventional PMI feedback control is described here by taking, as an example, a wireless base station and a mobile station to which a high-speed wireless communications system, Long Term Evolution (LTE), is applied. In the LTE technology, orthogonal frequency division multiplexing (OFDM) is adopted as a downlink (i.e., from the wireless base station to the mobile station) modulation scheme. FIG. 16 illustrates a signal format. The minimum unit of the signal is a subcarrier, and transmission data is allocated to each subcarrier. For example, in the case of transmitting data using a modulation scheme of quadrature phase shift keying (QPSK), 2-bit data is allocated to each subcarrier.

A signal unit formed by integrating multiple successive subcarriers is a resource block (hereinafter, sometimes referred also to as "RB"). Further, a signal unit formed by integrating multiple successive resource blocks is a subband. In the LTE technology, precoding is implemented using a resource block as the minimum unit. Note that in the following description, a subband is sometimes referred to as a predetermined frequency band, and a frequency band corresponding to a resource block is sometimes referred to as a sub-frequency band.

In the LTE technology, a mode is provided in which the mobile station selects a PMI with respect to each subband, which includes multiple successive resource blocks, and the selected PMI is fed back to the wireless base station (see, for example, TR36.213 V8.5.0 in 3GPP LTE specification documents). FIG. 17 illustrates an example of PMI feedback control. Assume that each subband includes, for example, four resource blocks. A subband b1 includes resource blocks r11 to r14, a subband b2 includes resource blocks r21 to r24, and a subband b3 includes resource blocks r31 to r34.

An arrow in each of the resource blocks in FIG. 17 illustrates an image of an ideal precoding matrix for the corresponding resource block. A precoding matrix m11 is used for precoding of the resource block r11, and a precoding matrix m12 is used for precoding of the resource block r12. Similarly, a precoding matrix m13 is used for precoding of the resource block r13, and a precoding matrix m14 is used for precoding of the resource block r14. In a similar fashion, precoding matrices m21 to m24 are used for precoding of the resource blocks r21 to r24, respectively. Precoding matrices m31 to m34 are used for precoding of the resource blocks r31 to r34, respectively.

The mobile station selects an optimum precoding matrix with respect to each subband according to, for example, the channel condition, and feeds a PMI corresponding to the selected precoding matrix back to the wireless base station. For example, for the subband b1, the mobile station feeds, back to the wireless station, a PMI corresponding to a precoding matrix M1 to be applied to the resource blocks r11 to r14. The PMI corresponding to the precoding matrix M1 is referred to as "PMI#1" in FIG. 17. Similarly, for the subband b2, the mobile station feeds, back to the wireless station, a PMI corresponding to a precoding matrix M2 to be applied to the resource blocks r21 to r24. The PMI corresponding to the precoding matrix M2 is referred to as "PMI#2" in FIG. 17. Further, for the subband b3, the mobile station feeds, back to the wireless station, a PMI corresponding to a precoding matrix M3 to be applied to the resource blocks r31 to r34. The PMI corresponding to the precoding matrix M3 is referred to as "PMI#3" in FIG. 17. Subsequently, based on each fed-back PMI, the wireless base station recognizes a precoding matrix to be used, and performs precoding by multiplying a transmission signal in a corresponding subband by the precoding matrix.

In the case where the delay spread of the channel between the mobile station and the wireless base station is small and there is little channel variation in the frequency direction, the variation in the precoding matrices of the resource blocks in each subband becomes small. According to FIG. 17, in each subband, the arrows of the precoding matrices point in the same direction. This indicates that there is a small variation in the precoding matrices within each subband. Therefore, in the above-described case with the conventional precoding, it is less likely that there is a large dissimilarity between an ideal precoding matrix for each resource block in a subband and a precoding matrix indicated by a PMI which is selected by the mobile station for the subband and fed back to the wireless base station. Accordingly, the wireless base station is able to achieve the effect of precoding by performing precoding using each precoding matrix indicated by a PMI which is fed back from the mobile station.

However, in the case where the delay spread of the channel between the mobile station and the wireless base station is large, the channel variation in the frequency direction becomes large. If the above-mentioned feedback control is performed under such a channel condition, the precoding effect is not achieved and thus the reception performance is degraded. FIG. 18 illustrates another example of PMI feedback control. A precoding matrix m11a is used for precoding of the resource block r11, and a precoding matrix m12a is used for precoding of the resource block r12. Similarly, a precoding matrix m13a is used for precoding of the resource block r13, and a precoding matrix m14a is used for precoding of the resource block r14. In a similar fashion, precoding matrices m21a to m24a are used for precoding of the resource blocks r21 to r24, respectively. Precoding matrices m31a to m34a are used for precoding of the resource blocks r31 to r34, respectively.

In the case where the mobile station performs PMI feedback to the wireless base station, for the subband b1, the mobile station feeds, back to the wireless station, a PMI corresponding to a precoding matrix M1a to be applied to the resource blocks r11 to r14. The PMI corresponding to the precoding matrix M1a is referred to as "PMI#1a" in FIG. 18. Similarly, for the subband b2, the mobile station feeds, back to the wireless station, a PMI corresponding to a precoding matrix M2a to be applied to the resource blocks r21 to r24. The PMI corresponding to the precoding matrix M2a is referred to as "PMI#2a" in FIG. 18. Further, for the subband b3, the mobile station feeds, back to the wireless station, a PMI corresponding to a precoding matrix M3a to be applied to the resource blocks r31 to r34. The PMI corresponding to the precoding matrix M3a is referred to as "PMI#3a" in FIG. 18.

In the case where the delay spread of the channel between the mobile station and the wireless base station is large and there is a large channel variation in the frequency direction, the variation in the precoding matrices of the resource blocks in each subband becomes large. According to FIG. 18, in each subband, the arrows of the precoding matrices point in random directions. This indicates that there is a large variation in the precoding matrices within each subband.

Under such a condition, there is a large dissimilarity between an ideal precoding matrix for each resource block in a subband and a precoding matrix indicated by a PMI which is selected by the mobile station for the subband and fed back to the wireless base station. Referring to, for example, the subband b1, it may be seen that the precoding matrix M1a of the subband b1 is largely dissimilar to each of the ideal precoding matrices m11a to m14a for the resource blocks r11 to r14. This means that one precoding matrix may not be a representative of the precoding matrices for the resource blocks r11 to r14. This is also the case with the remaining subbands b2 and b3. Accordingly, the wireless base station may not fully achieve the precoding effect because precoding is performed on a transmission signal of each resource block using a precoding matrix largely dissimilar to a corresponding ideal precoding matrix of the resource block. Accordingly, in the case described above, the precoding effect may not be achieved and thus the reception performance is degraded.

On the other hand, it may be considered of feeding back a PMI with respect to, not each subband, but each resource block. FIG. 19 illustrates PMI feedback control in which PMIs of all resource blocks are fed back. The mobile station feeds, back to the wireless base station, all of PMI#1b to PMI#12b which correspond to ideal precoding matrices m1b to m12b, respectively, of resource blocks r1b to r12b. However, such PMI feedback control with respect to each resource block is not a practical solution since the PMI feedback for all the resource blocks results in an increase in the amount of feedback information, which in turn reduces resources available for normal data transmission.

SUMMARY

In one aspect of the embodiments, there is provided a wireless communication apparatus that includes: an index value control unit configured to transmit, to a different wireless communication apparatus, one or more index values which indicate one or more precoding matrices to be used for precoding performed by the different wireless communication apparatus; and a deprecoding unit configured to perform deprecoding using precoding matrices corresponding to the one or more index values transmitted by the index value control unit in past, wherein the index value control unit transmits, to the different wireless communication apparatus at each transmission timing, index values generated based on a result of a channel condition measurement for entire or some of sub-frequency bands belonging to a predetermined frequency band, a count of the index values transmitted to the different wireless communication apparatus being less than a count, N, of the entire sub-frequency bands belonging to the predetermined frequency band, and the deprecoding unit selects, from the one or more index values transmitted by the index value control unit in the past, an index value to be applied to a data block for which no index value is transmitted, according to a time or a frequency of the data block for which no index value is transmitted, and performs deprecoding for the data block for which no index value is transmitted, using the selected index value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 19 illustrates the PMI feedback control in which PMIs of all resource blocks are fed back.

DESCRIPTION OF EMBODIMENTS

Figure 1:
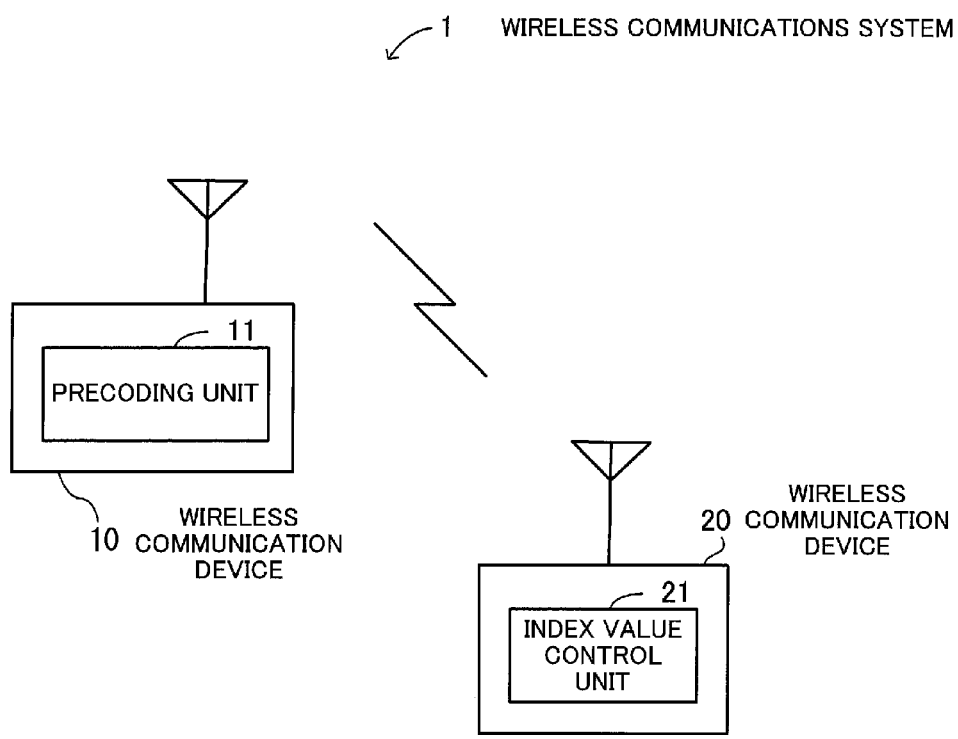
FIG. 1 illustrates a configuration example of a wireless communications system.

Several embodiments will be described below with reference to the accompanying drawings, wherein like reference numerals refer to like elements throughout. FIG. 1 illustrates a configuration example of a wireless communications system. A wireless communications system 1 includes a wireless communication device 10 (first wireless communication apparatus) and a wireless communication device 20 (second wireless communication apparatus). The wireless communication device 10 includes a precoding unit 11, and the wireless communication device 20 includes an index value control unit 21.

The precoding unit 11 performs precoding by executing computation processing, using a precoding matrix indicated by an index value, with respect to each predetermined data block to which transmission data is allocated. The index value is transmitted from a mobile station (in this case, the wireless communication device 20) with respect to each data block and indicates a precoding matrix to be used for the data block. The index value control unit 21 transmits such index values to the wireless communication device 10. At this point, the index value control unit 21 may transmit, to the wireless communication device 10, index values corresponding to some data blocks according to an index value transmission rule. Here, transmitting "index values corresponding to some data blocks" means transmitting index values to the wireless communication device 10 in a discontinuous (i.e., skipping) manner so that index values corresponding to some data blocks are transmitted but index values corresponding to other data blocks are not transmitted, rather than transmitting index values corresponding to all data blocks in a continuous manner. Note that the discontinuous manner of the index value transmission is defined by the index value transmission rule.

On the other hand, based on the transmitted index values, the precoding unit 11 interpolates index values corresponding to data blocks, for which index values are not transmitted, according to a given interpolation rule. For example, in the case where index values corresponding to six out of ten data blocks are transmitted, the precoding unit 11 interpolates index values corresponding to the remaining four data blocks, for which index values are not transmitted, according to the interpolation rule. Subsequently, based on ten index values (the transmitted six index values and the four index values obtained by the interpolation) individually corresponding to the ten data blocks, the precoding unit 11 performs precoding of each of the data blocks using a precoding matrix indicated by a corresponding one of the ten index values (the detailed operation is described later).

Figure 2:
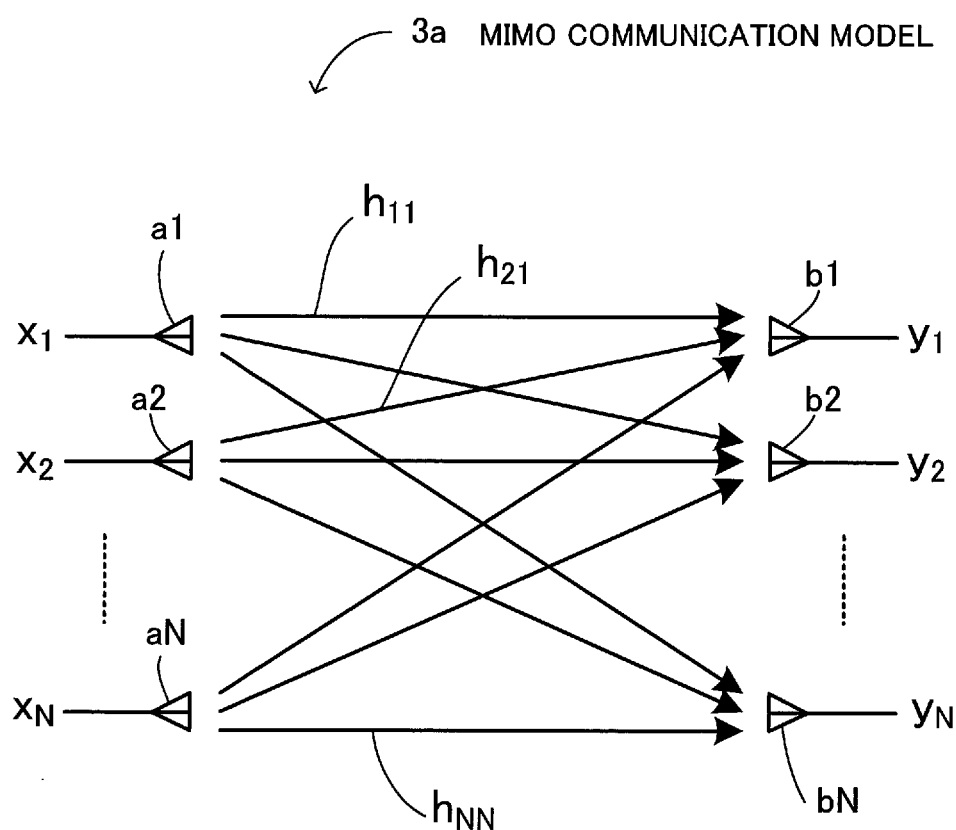
FIG. 2 illustrates a model of MIMO communication.

Next described is precoding. FIG. 2 illustrates a model of MIMO communication. A MIMO communication model 3a of FIG. 2 has the same number, N, of transmitting antennas and receiving antennas. $x_i$ ($1 \le i \le N$) is a signal transmitted from an i-th transmitting antenna among transmitting antennas a1 to aN, and $y_i$ ($1 \le i \le N$) is a signal received by an i-th receiving antenna among receiving antennas b1 to bN. In addition, $h_{ij}$ ($1 \le i \le N$, $1 \le j \le N$) is a condition of a channel between the i-th transmitting antenna and a j-th receiving antenna. A transmission signal is an N×1 column vector x, a reception signal is an N×1 column vector y, and a channel matrix describing channel conditions is an N×N matrix H. In the MIMO communication model 3a, each of the receiving antennas b1 to bN receives combined signals, each transmitted from the individual transmitting antennas a1 to 1N. This is expressed in a matrix equation as indicated by Equation (1) below (noise is ignored).

$$y = Hx \quad (1)$$

In addition, when the transmission signal vector $x = (x_1, x_2, \ldots, x_N)$, the reception signal vector $y = (y_1, y_2, \ldots, y_N)$, and elements of the channel matrix H are represented by Equation (2) below, Equation (1) may be expressed as Equation (3) below.

$$H = \begin{bmatrix} h_{11} & h_{12} & \ldots & h_{1N} \\ h_{21} & h_{22} & \ldots & h_{2N} \\ & & \vdots & \\ h_{N1} & h_{N2} & \ldots & h_{NN} \end{bmatrix} \quad (2)$$

$$\begin{bmatrix} y_1 \\ y_2 \\ \vdots \\ y_N \end{bmatrix} = \begin{bmatrix} h_{11} \cdot x_1 + \ldots + h_{1N} \cdot x_N \\ h_{21} \cdot x_1 + \ldots + h_{2N} \cdot x_N \\ \vdots \\ h_{N1} \cdot x_1 + \ldots + h_{NN} \cdot x_N \end{bmatrix} \quad (3)$$

Assume that a value of each element of the channel matrix H is obtained by channel estimation performed by the receiver end. It is here considered to estimate signals transmitted from the transmitting antennas based on signals received by the receiving antennas. For example, consider estimating the transmission signal $x_1$ of the transmitting antenna a1 based on the reception signal $y_1$ of the receiving antenna b1. According to Equation (3), it is obtained that $y_1 = h_{11} \cdot x_1 + h_{12} \cdot x_2 + \ldots + h_{1N} \cdot x_N$, however, the obtained equation includes unknown parameters of $x_2$ to $x_N$. This indicates that the transmission signals $x_2$ to $x_N$ of the transmitting antennas a2 to aN are interference signals. Therefore, the estimation of the transmission signal $x_1$ of the transmitting antenna a1 is made by removing those interference signals.

Figure 3:
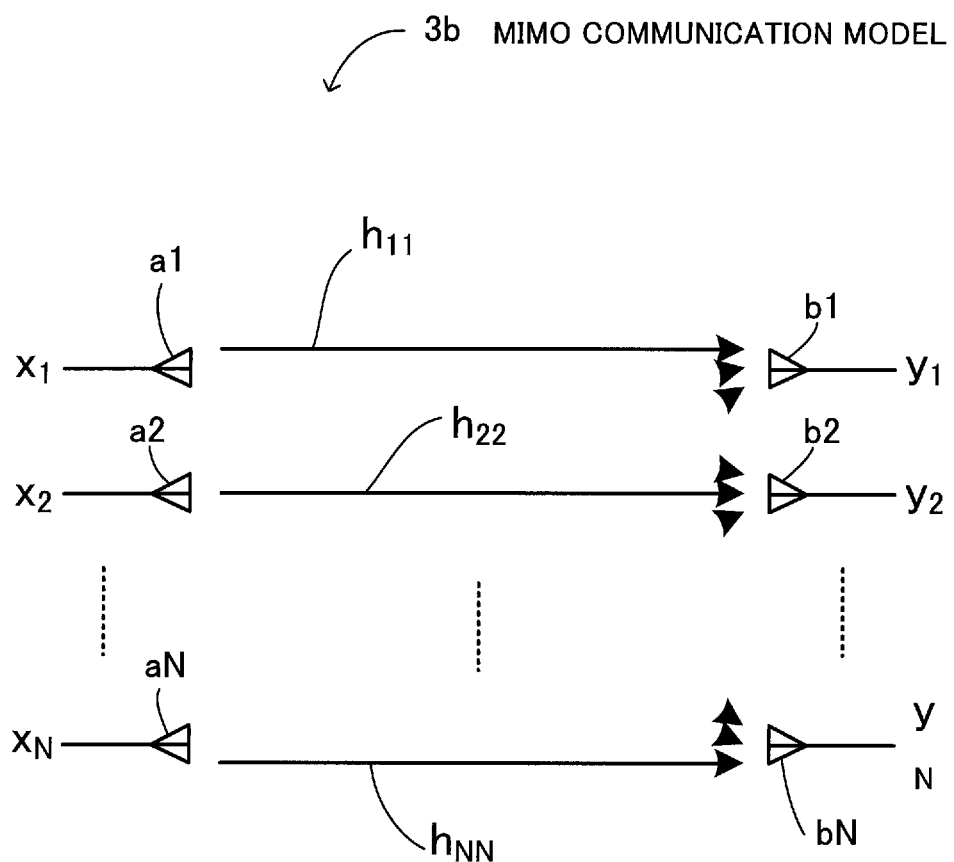
FIG. 3 illustrates another model of the MIMO communication.

On the other hand, an ideal model is considered in which an independent channel path is established between each of the transmitting antennas and a corresponding receiving antenna. FIG. 3 illustrates another model of the MIMO communication. In a MIMO communication model 3b, the transmission signal $x_1$ from the transmitting antenna a1 is received as the reception signal $y_1$ via the receiving antenna b1, and the transmission signal $x_2$ from the transmitting antenna a2 is received as the reception signal $y_2$ via the receiving antenna b2. Thus, signals are transmitted and received with one-to-one correspondence between the transmitting antennas and the receiving antennas.

In such a channel condition, off-diagonal elements of the channel matrix H expressed by Equation (2) become zero, and the channel matrix H may be expressed as a channel matrix Ha as represented by Equation (4) below.

$$Ha = \begin{bmatrix} h_{11} & 0 & \ldots & 0 \\ 0 & h_{22} & \ldots & 0 \\ \vdots & & \ddots & \\ 0 & 0 & \ldots & h_{NN} \end{bmatrix} \quad (4)$$

Accordingly, Equation (5) below is obtained when the transmission and reception condition of the MIMO communication model 3b is expressed in a matrix equation using the channel matrix Ha.

$$\begin{bmatrix} y_1 \\ y_2 \\ \vdots \\ y_N \end{bmatrix} = \begin{bmatrix} h_{11} \cdot x_1 \\ h_{22} \cdot x_2 \\ \vdots \\ h_{NN} \cdot x_N \end{bmatrix} \qquad (5)$$

As is understood from Equation (5), it is possible to readily estimate a transmission signal from a reception signal. For example, in the case of estimating the transmission signal $x_1$ of the transmitting antenna a1 based on the reception signal $y_1$ of the receiving antenna b1, $x_1$ may be readily estimated since $y_1 = h_{11} \cdot x_1$ according to Equation (5) and $y_1$ and $h_{11}$ are known values.

The above case is described next in a generalized form. The N×N channel matrix H, which represents channel conditions between the transmitter and the receiver, is multiplied by an N×N matrix in such a manner that the off-diagonal elements of a matrix resulted from the multiplication become zero. When the N×N matrix used to multiply the channel matrix H is denoted as U, the matrix HU resulted from the multiplication is expressed as Equation (6).

$$HU = \begin{bmatrix} \lambda_1 & \cdots & & \\ 0 & \lambda_2 & \cdots & 0 \\ \vdots & & \ddots & \\ 0 & 0 & \cdots & \lambda_N \end{bmatrix} \qquad (6)$$

When the matrix HU is multiplied by the vectors of the transmission signals, the vector of the reception signals is expressed by Equation (7).

$$y = HUx = \begin{bmatrix} \lambda_1 \cdot x_1 \\ \vdots \\ \lambda_N \cdot x_N \end{bmatrix} \qquad (7)$$

Precoding is technology based on the above description. On the transmitter end, the transmission signals are multiplied by the matrix U, and then, on the receiver end, the transmission signals are estimated from the reception signals respectively received by the receiving antennas based on values of individual elements of the channel matrix H, which values are obtained by channel estimation, and values of $\lambda_1, \ldots,$ and $\lambda_N$ of the matrix U. With this, the receiver end is able to estimate the signals transmitted by the multiple transmitting antennas from the received combined signals.

Note that the matrix U may be calculated on the receiver end based on the cannel estimation values. If the receiver end feeds the elements of the matrix U back to the transmitter end, the transmitter and the receiver may share the same matrix U. Note however that in the case where there are a large number of transmitting antennas and receiving antennas, the computational complexity of the matrix U increases. In addition, feeding all elements of the matrix U calculated by the receiver back to the transmitter leads to an increase in the amount of the feedback information.

In view of the above, in the precoding processing, the transmitter and the receiver share a precoding matrix set (precoding codebook) in which multiple precoding matrices are registered, and PMIs corresponding to indexes of the precoding codebook are fed back. Feeding back PMIs reduces the amount of feedback information to a few bits compared to the case of feeding back all the elements of the matrices. In addition, the receiver is able to improve the reception performance by selecting and feeding back PMIs which enable the reception performance to be improved to a maximum extent.

Next described is the relationship between channel delay spread and channel variation in the frequency direction. In the LTE technology, OFDM is adopted as a downlink (for example, from a wireless base station to a mobile station) modulation scheme. A transmitter (for example, a wireless base station) converts a frequency domain signal u(f) into a time domain signal s(t) using Inverse Fast Fourier Transform (IFFT), and then transmits the signal s(t). A receiver (for example, a mobile station) converts a received time domain signal s'(t) into a frequency domain signal u'(f) using Fast Fourier Transform (FFT). When IFFT is denoted as $F^{-1}$, the relationship between the frequency domain signal u(f) and the time domain signal s(t) is expressed by Equation (8) below.

$$s(t) = F^{-1}[u(f)] \qquad (8)$$

In addition, when FFT is denoted as F, the relationship between the frequency domain signal u(f) and the time domain signal s(t) is expressed by Equation (9) below.

$$u(f) = F[s(t)] \qquad (9)$$

Here is considered of a delay wave s(t−τ) which is received with a delay of time τ compared to the direct wave s(t). When a reception signal at the receiver is denoted as s'(t), the reception signal s'(t) is expressed by Equation (10) below because the reception signal s'(t) is received in the form where the direct wave and the delay wave are combined with each other. Assume here that there is no change in channel amplitude and phase.

$$s'(t) = s(t) + s(t-\tau) \qquad (10)$$

Conversion of the reception signal s'(t) into the frequency domain signal u'(f) using FTT is calculated as Equation (11) below. Note that in the case where the time function is shifted by the delay time τ, the frequency function is multiplied by $e^{-j2\pi\tau}$.

$$\begin{aligned} u'(f) &= F[s'(t)] \\ &= F[s(t) + s(t-\tau)] \\ &= F[s(t)] + F[s(t-\tau)] \\ &= u(f) + u(f) \cdot \exp(-j2\pi\tau) \\ &= u(f)(1 + \exp(-j2\pi\tau)) \end{aligned} \qquad (11)$$

According to Equation (11), it may be understood that the received frequency domain signal u'(f) is a signal in which a "rotation" in a complex plane has been applied to the transmitted frequency domain signal u(f). Note that the "rotation" here means, for example, a change in phase and amplitude. In addition, the speed of the rotation depends on the delay time τ between the direct wave and the delay wave, and the rotation becomes faster as the delay time τ become longer.

Note that, practically, it is sometimes the case that there is more than one delay wave and many delay waves after passing through various channels are combined. A parameter indicating the average delay time of those delay waves is delay spread. Accordingly, the channel variation in the frequency direction becomes small when the channel delay spread is small, and the channel variation in the frequency direction becomes large when the channel delay spread is large.

Next described in detail are the configuration and operations of the wireless communications system 1 with an example in which the wireless communications system 1 is applied to a LTE wireless system. Note that, in general, a single wireless communication device has both precoding and deprecoding functions.

The following describes a system configuration in which a mobile station transmits index values (PMIs) to a wireless base station, which then performs precoding, and the mobile station performs deprecoding. A system configuration also exists in which the wireless base station transmits PMIs to the mobile station, which then performs precoding, and the wireless base station performs deprecoding, however, similar control is carried out and the explanation is accordingly omitted. Here, data blocks to which transmission data is allocated are resource blocks.

Figure 4:
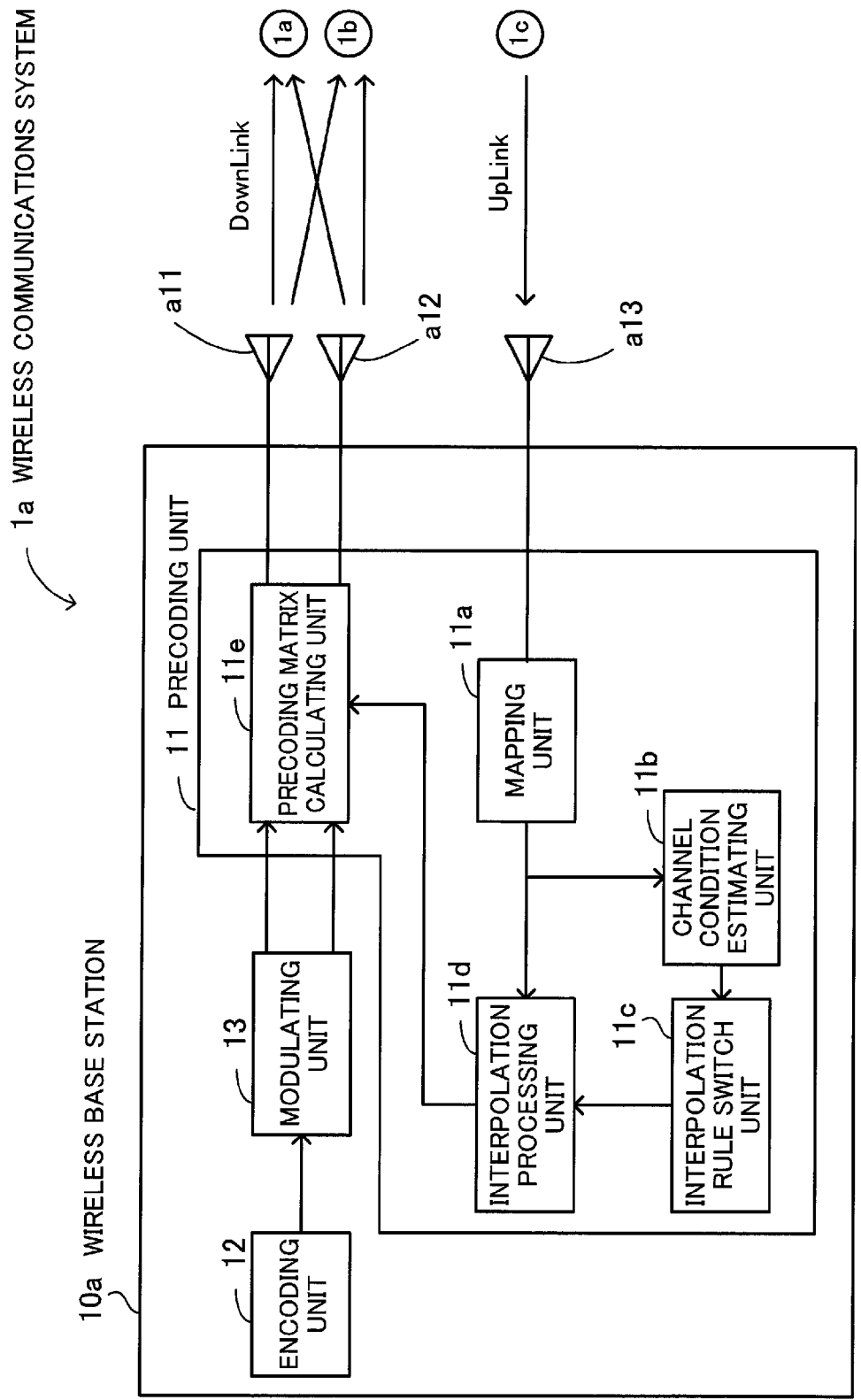
FIG. 4 illustrates a configuration example related to a wireless communications system.
Figure 5:
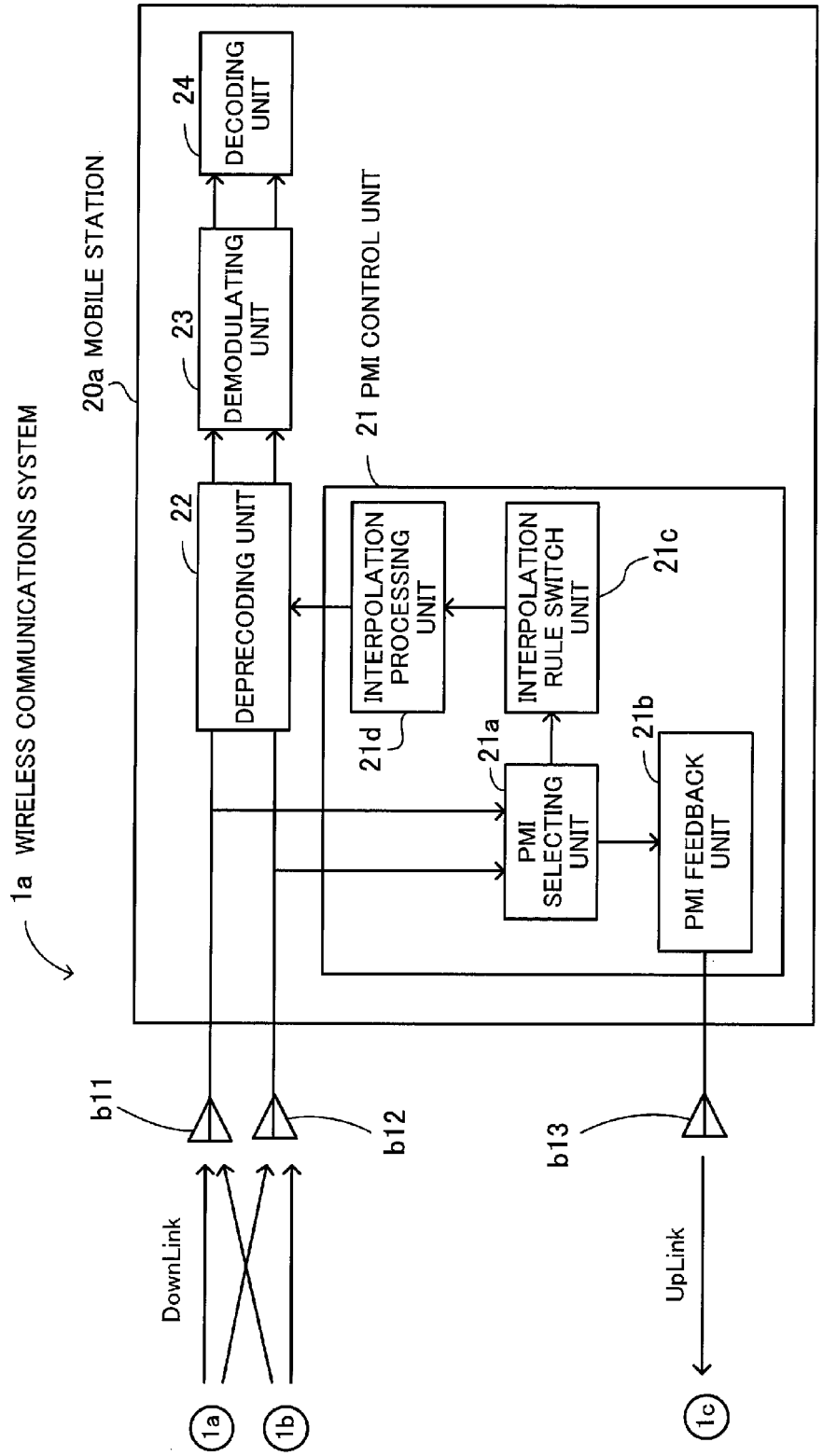
FIG. 5 illustrates a configuration example related to the wireless communications system of FIG. 4.

FIGS. 4 and 5 illustrate configuration examples related to a wireless communications system. FIG. 4 illustrates a configuration example of a wireless base station, and FIG. 5 illustrates a configuration example of a mobile station. A wireless communications system 1a includes a wireless base station 10a and a mobile station 20a. The wireless base station 10a includes antennas a11 to a13, the precoding unit 11, an encoding unit 12, and a modulating unit 13. On the other hand, the mobile station 20a includes antennas b11 to b13, the PMI control unit (index value control unit) 21, a deprecoding unit 22, a demodulating unit 23, and a decoding unit 24.

Note that the wireless base station 10a and the mobile station 20a individually have a storage unit such as a database for storing information including interpolation rules, PMIs, a precoding codebook, and the like, although it is not illustrated in FIGS. 4 and 5. FIGS. 4 and 5 illustrate that different antennas are used for data transmission and PMI feedback, however, in practice, data transmission and PMI feedback may be performed using the same antenna.

In the wireless base station 10a of FIG. 4, the encoding unit 12 performs encoding (such as Turbo encoding) on bit sequences to be transmitted. The modulating unit 13 modulates the encoded bit sequences using a predetermined modulation scheme (such as QPSK and 16 quadrature amplitude modulation (QAM)), which are thereby converted into transmission symbols.

The precoding unit 11 includes a mapping unit 11a, a channel condition estimating unit 11b, an interpolation rule switch unit 11c, an interpolation processing unit 11d, and a precoding matrix calculating unit 11e. The mapping unit 11a receives PMIs fed back from the mobile station 20a via the antenna a13, and allocates the PMIs to appropriate resource blocks according to a feedback rule (index value transmission rule). The channel condition estimating unit 11b estimates a channel condition by calculating magnitudes of changes in the channel condition in both the frequency and time directions based on the fed-back PMIs. Based on the result of the channel condition estimation, the interpolation rule switch unit 11c performs switching among interpolation rules to apply an optimum interpolation rule. Based on the determined interpolation rule, the interpolation processing unit 11d interpolates PMIs corresponding to resource blocks for which PMIs are not fed back, using the fed-back PMIs (that is, the fed-back PMIs correspond to only some of the entire resource blocks). The precoding matrix calculating unit 11e multiplies the transmission symbols mapped to the antennas a11 and a12 by precoding matrices, which correspond to PMIs of the entire resource blocks output from the interpolation processing unit 11d.

In the mobile station 20a of FIG. 5, the PMI control unit 21 includes a PMI selecting unit 21a, a PMI feedback unit 21b, an interpolation rule switch unit 21c, and an interpolation processing unit 21d. The PMI selecting unit 21a estimates the channel condition based on data received via the antennas b11 and b12, and selects optimum PMIs for individual resource blocks based on the estimation result. According to a feedback rule, the PMI feedback unit 21b extracts, from the PMIs selected by the PMI selecting unit 21a, PMIs to be fed back to the wireless base station 10a, and transmits the extracted PMIs via the antenna b13. Note that the PMIs to be fed back to the wireless base station 10a correspond to only some of the entire resource blocks. Based on the result of the channel condition estimation performed by the PMI selecting unit 21a, the interpolation rule switch unit 21c performs switching among interpolation rules to apply an optimum interpolation rule. Based on the determined interpolation rule, the interpolation processing unit 21d interpolates PMIs corresponding to resource blocks for which PMIs are not fed back, using the fed-back PMIs.

The above-described operations pertaining to the PMI control unit 21 are summarized as follows. According to the same interpolation rule used by the first wireless communication device, the PMI control unit 21 interpolates index values corresponding to data blocks for which index values are not transmitted, using the index values transmitted to the first wireless communication device.

On the other hand, the deprecoding unit 22 recognizes inverse matrices of the precoding matrices based on PMIs of the entire resource blocks, output from the interpolation processing unit 21d. Subsequently, the deprecoding unit 22 multiplies symbols received by the antennas b11 and b12 by the inverse matrices. The demodulation unit 23 removes channel variations and a noise component from the received symbols, and converts the obtained product into bit sequences. The decoding unit 24 removes, from the bit sequences, encoding performed by the wireless base station 10a, and performs error correction.

Note that the function blocks of the wireless base station 10a and the function blocks of the mobile station 20a are separately provided in the above description. However, a single wireless communication device may have the function blocks of both the wireless base station 10a and the mobile station 20a.

Figure 6:
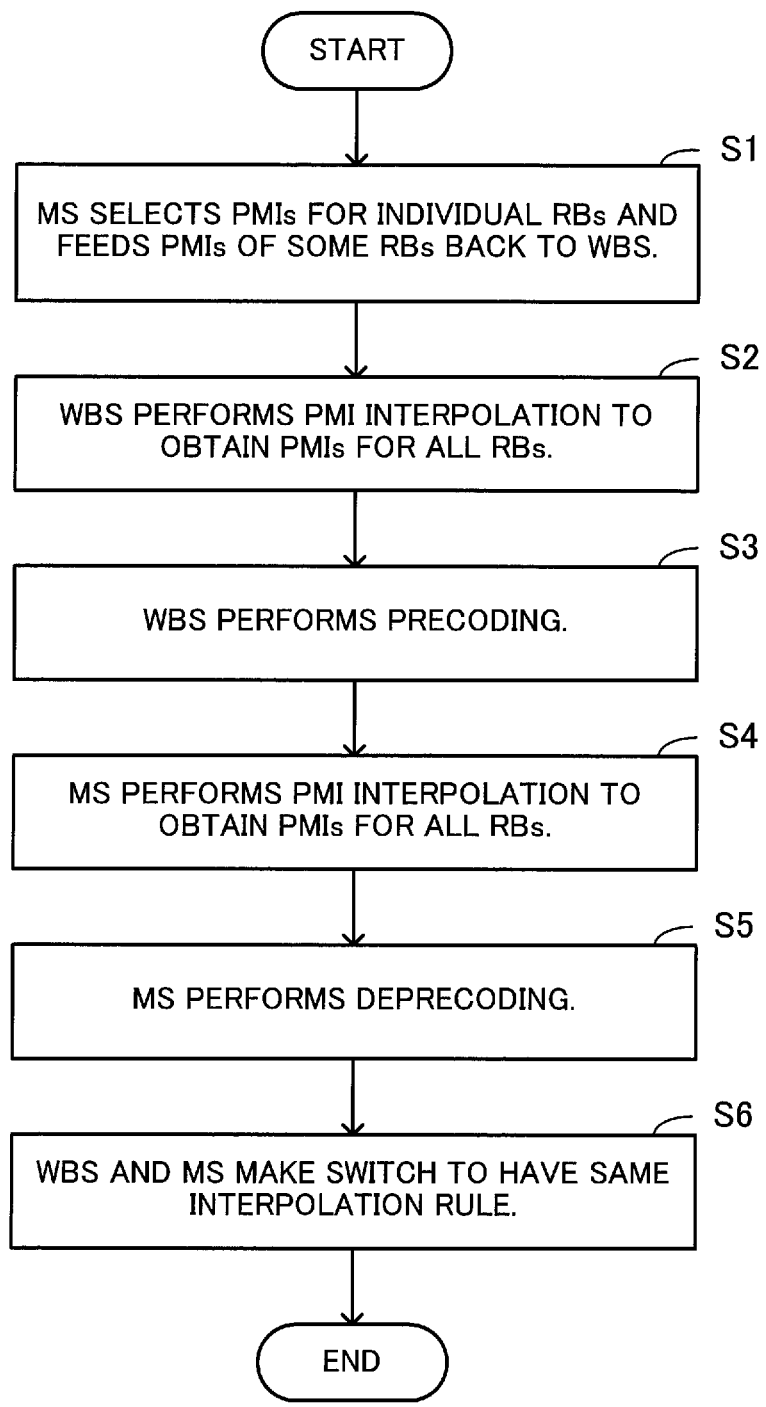
FIG. 6 is a flowchart illustrating operations of the wireless communications system of FIGS. 4 and 5.

Next described are overall operations with reference to a flowchart. FIG. 6 is a flowchart illustrating operations of the wireless communications system 1a. In FIG. 6, the wireless base station 10a is denoted as "WBS" and the mobile station 20a is denoted as "MS".

<Step S1> Based on the channel condition obtained by the channel estimation, the mobile station 20a selects an optimum PMI for each of the entire resource blocks, and feeds back, to the wireless base station 10a, PMIs corresponding to only some of the entire resource blocks according to a feedback rule.

<Step S2> Based on the fed-back PMIs, the wireless base station 10a performs an interpolation according to a given interpolation rule to thereby obtain PMIs for the entire resource blocks.

<Step S3> The wireless base station 10a performs precoding by multiplying a transmission signal with respect to each resource block using precoding matrices corresponding to the obtained PMIs, and transmits the precoded transmission signals to the mobile station 20a.

<Step S4> According to the same interpolation rule used by the wireless base station 10a, the mobile station 20a performs a PMI interpolation for resource blocks for which PMIs are not fed back to thereby obtain PMIs for the entire resource blocks.

Note that the mobile station 20a has already obtained the PMIs for all resource blocks by the channel estimation in Step S1, however, the mobile station 20a newly obtains PMIs corresponding to resource blocks, for which PMIs are not fed back, by the same interpolation processing used by the wireless base station 10a using the same interpolation rule. With this, the operating state of the wireless base station 10a and that of the mobile station 20a are matched to each other.

<Step S5> The mobile station 20a performs deprecoding by multiplying a reception signal with respect to each resource block using inverse matrices of precoding matrices corresponding to the obtained PMIs, and demodulates and decodes the deprecoded signals.

<Step S6> The wireless base station 10a and the mobile station 20a estimate the magnitude of channel variation based on the fed-back PMIs according to the same rule, and make a switch to have the same interpolation rule according to the result of the channel estimations (at this point, a switch of the feedback rule may also be performed).

Next described are feedback rules (index value transmission rules). Based on the result of the channel estimation, the mobile station 20a selects optimum PMIs for individual resource blocks, and feeds only PMIs for some of the resource blocks back to the wireless base station 10a via the uplink so as not to increase the amount of the feedback information. In this case, information pertaining to PMIs of which resource blocks are to be fed back is shared between the wireless base station 10a and the mobile station 20a as a feedback rule. One feedback rule may specify that numbers of resource blocks whose PMIs are to be fed back are uniquely determined, using a mathematical formula or the like, based on numbers assigned to individual sub-frames (the smallest units of the time frame). Specifically, for example, in the case of transmitting a sub-frame having a sub-frame number of 1 (#1), PMIs of the $0^{th}$, $5^{th}$, and $10^{th}$ resource blocks in the #1 sub-frame are to be fed back, and in the case of transmitting a sub-frame having a sub-frame number of 2 (#2), PMIs of the $3^{rd}$, $8^{th}$, and $13^{th}$ resource blocks in the #2 sub-frame are to be fed back.

Figure 7:
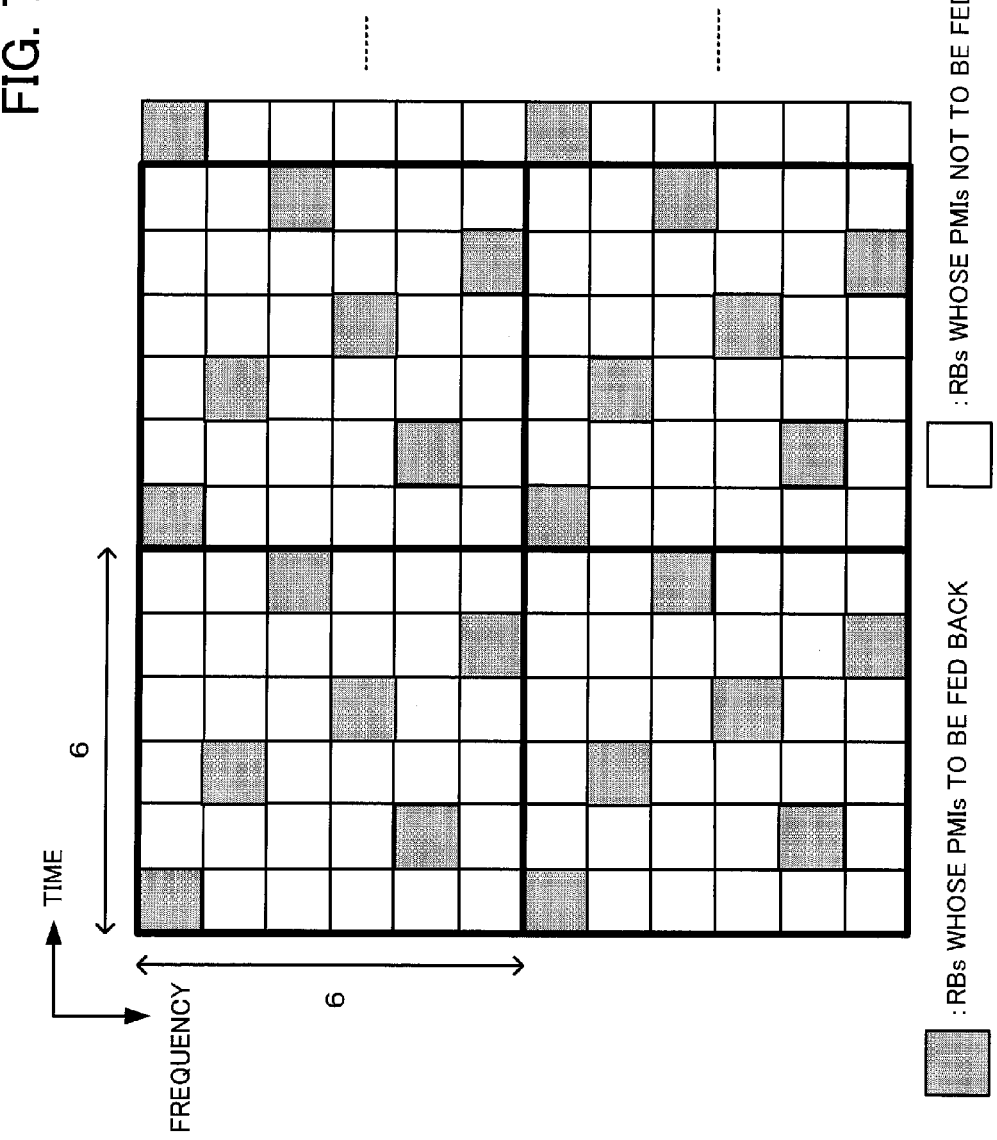
FIG. 7 illustrates an example of PMI feedback in a repeated pattern.

Alternatively, another feedback rule may specify a repetition of a feedback pattern. FIG. 7 illustrates an example of PMI feedback in a repeated pattern. The smallest cell represents one resource block, and FIG. 7 illustrates a feedback rule based on the repeated pattern. Colored cells represent resource blocks whose PMIs are to be fed back, and non-colored cells represent resource blocks whose PMIs are not to be fed back. In this example, resource blocks for feedback are changed with respect to each frequency in a cyclic manner, and the repetition unit is an array of 6 by 6 resource blocks. In this manner, the amount of the feedback information is reduced by, not feeding back PMIs corresponding to the entire resource blocks, but feeding back PMIs corresponding to only some of the entire resource blocks in each frequency band.

Note that, regarding the feedback rule, the point is that the wireless base station 10a and the mobile station 20a share the information pertaining to PMIs for which resource blocks are to be fed back. Accordingly, the PMI feedback pattern for the resource blocks does not necessarily have a periodicity in the time and frequency directions, and an arbitrary pattern may be adopted.

Figure 8:
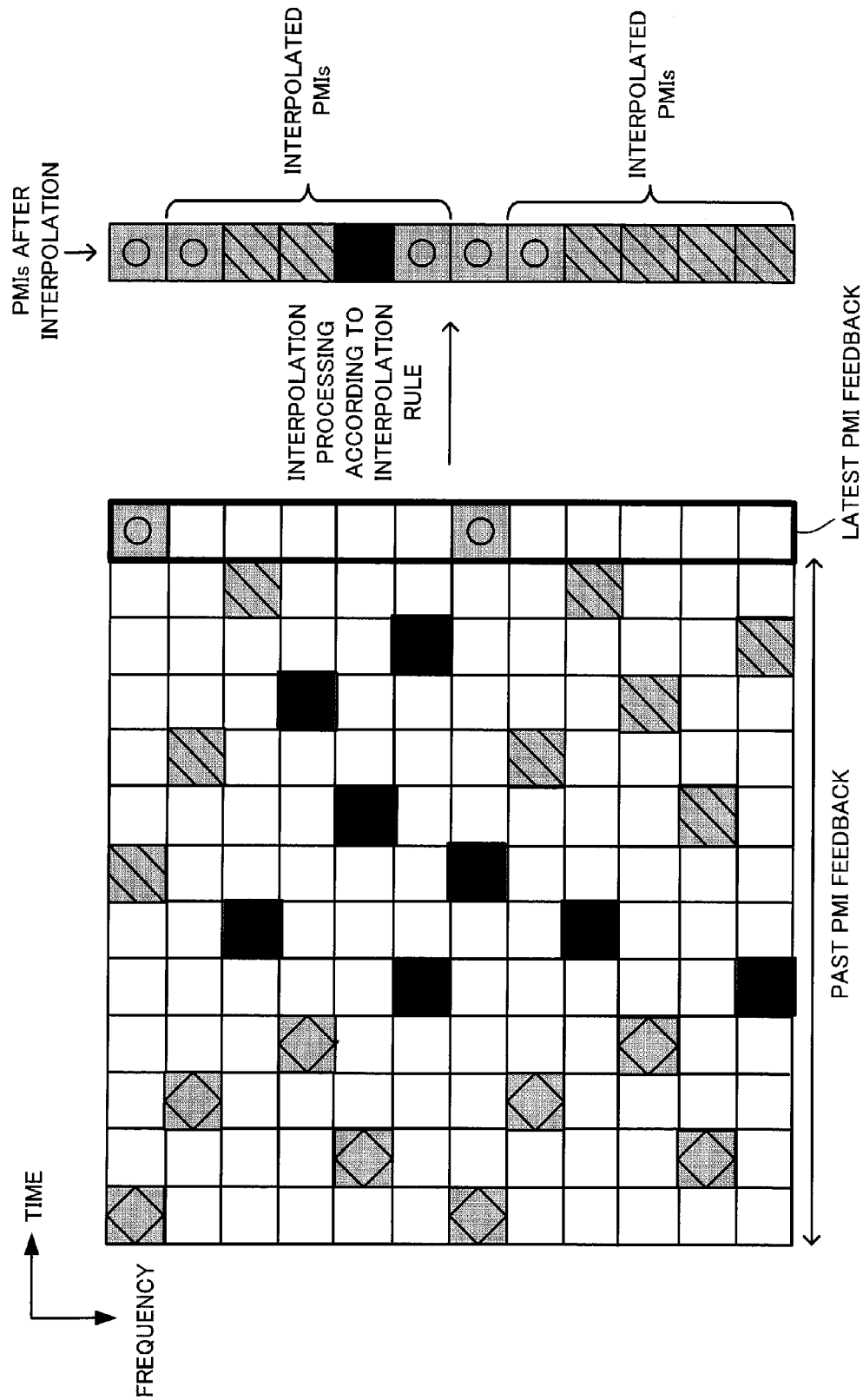
FIG. 8 illustrates interpolation processing.

Next described are the interpolation processing and interpolation rules. FIG. 8 illustrates interpolation processing. In FIG. 8, colored cells represent resource blocks whose PMIs are fed back, and cells with an identical pattern represent resource blocks for which the same PMI is fed back. Non-colored cells represent resource blocks whose PMIs are not fed back. The wireless base station 10a obtains PMIs for individual resource blocks, which are applied to the precoding process of transmission signals, by performing an interpolation of PMIs, which are not fed back, according to an interpolation rule. The interpolation is achieved by, for example, using PMIs of only some of the entire resource blocks fed back in the fourth previous sub-frame (corresponding to "latest PMI feedback" in FIG. 8) and PMIs for some resource blocks fed back before the fourth previous sub-frame (corresponding to "past PMI feedback" in FIG. 8). Note that, in the LTE technology, it is specified to apply the latest PMIs among PMIs fed back in and before the fourth previous sub-frame counted from a sub-frame to be currently transmitted.

On the other hand, the mobile station 20a obtains PMIs, which are used to decode the precoded reception signals, with respect to individual resource blocks by performing the same interpolation processing as performed by the wireless base station 10a with the use of PMIs previously fed back to the wireless base station 10a. If the interpolation rule used is the same, that is, if the interpolation rule is shared between the wireless base station 10a and the mobile station 20a, the wireless base station 10a and the mobile station 20a obtain exactly the same PMIs. Accordingly, it is no need for the wireless base station 10a to transmit the PMIs applied to the transmission signals to the mobile station 20a, which prevents a reduction in resources.

Next described are more specific examples regarding the PMI interpolation processing. For resource blocks for which PMIs are not fed back, PMIs are interpolated by copying fed-back PMIs of neighboring resource blocks. In this case, the neighboring resource blocks selected for the copying change depending on the channel condition. The interpolation processing may be based on the correlation in the same frequency, the correlation in the same period of time, and the correlation of proximity.

Figure 9:
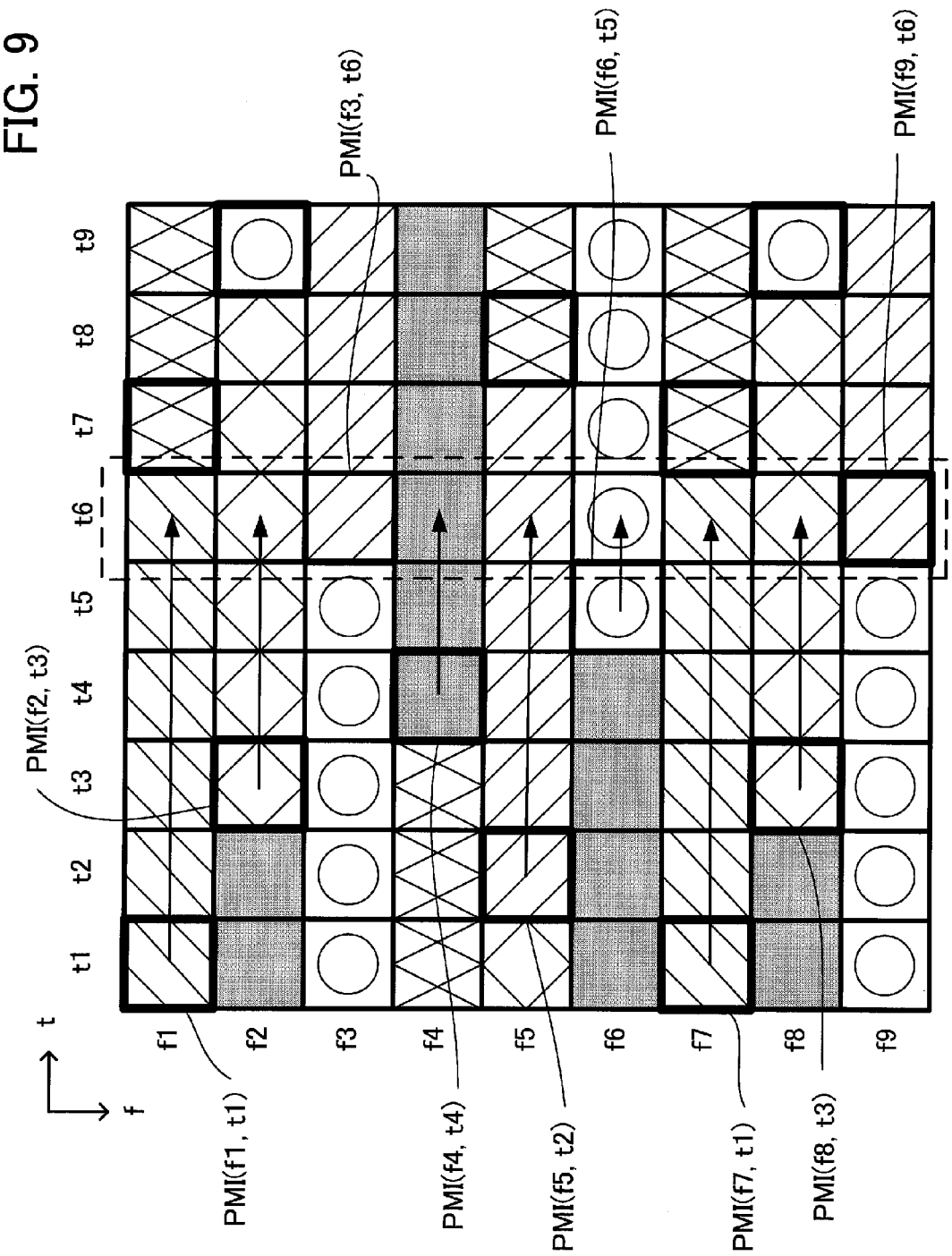
FIG. 9 illustrates an example of PMI interpolation processing.

(1) PMI Interpolation According to an Interpolation Rule Based on the Correlation in the Same Frequency FIG. 9 illustrates one example of the PMI interpolation processing. In FIG. 9, cells each surrounded by a black border represent resource blocks whose PMIs are fed back. Cells with an identical pattern represent resource blocks for which the same PMI is fed back. It is considered here to obtain PMIs for the entire resource blocks in a time t6, which is indicated by the dotted frame in FIG. 9. Note that in the following description, a resource block whose frequency is fm and time is tn is expressed as "resource block rb(fm, tn)", and a PMI of the resource block rb(fm, tn) is expressed as "PMI(fm, tn)".

According to an interpolation rule based on the correlation in the same frequency, a PMI interpolation for each resource block for which a PMI is not fed back is achieved by searching past resource blocks in the same frequency for a resource block whose PMI is fed back most recently and using the PMI fed back most recently for the interpolation. For example, in a frequency f1, the PMI fed back most recently is PMI(f1, t1) of a resource block rb(f1, t1). Accordingly the PMI of a resource block rb(f1, t6) is interpolated with PMI(f1, t1). In a frequency f2, the PMI fed back most recently is PMI(f2, t3) of a resource block rb(f2, t3). Accordingly, the PMI of a resource block rb(f2, t6) is interpolated with PMI(f2, t3). In a frequency f3, PMI(f3, t6) of a resource block rb(f3, t6) is directly used. Similarly, in a frequency f4, the PMI fed back most recently is PMI(f4, t4) of a resource block rb(f4, t4). Accordingly, the PMI of a resource block rb(f4, t6) is interpolated with PMI(f4, t4). In a frequency f5, the PMI fed back most recently is PMI(f5, t2) of a resource block rb(f5, t2). Accordingly, the PMI of a resource block rb(f5, t6) is interpolated with PMI(f5, t2). In a frequency f6, the PMI fed back most recently is PMI(f6, t5) of a resource block rb(f6, t5). Accordingly, the PMI of a resource block rb(f6, t6) is interpolated with PMI(f6, t5). In a frequency f7, the PMI fed back most recently is PMI(f7, t1) of a resource block rb(f7, t1). Accordingly, the PMI of a resource block rb(f7, t6) is interpolated with PMI(f7, t1). In a frequency f8, the PMI fed back most recently is PMI(f8, t3) of a resource block rb(f8, t3). Accordingly, the PMI of a resource block rb(f8, t6) is interpolated with PMI(f8, t3). In a frequency f9, PMI(f9, t6) of a resource block rb(f9, t6) is directly used.

In the case where the moving speed of the mobile station 20a is slow, the channel condition exhibits relatively small changes in the time direction, and therefore, PMIs have strong correlations in the same frequency. Accordingly, in the case where the moving speed of the mobile station 20a is slow, it is effective to apply an interpolation rule based on the correlation in the same frequency as described above.

Figure 10:
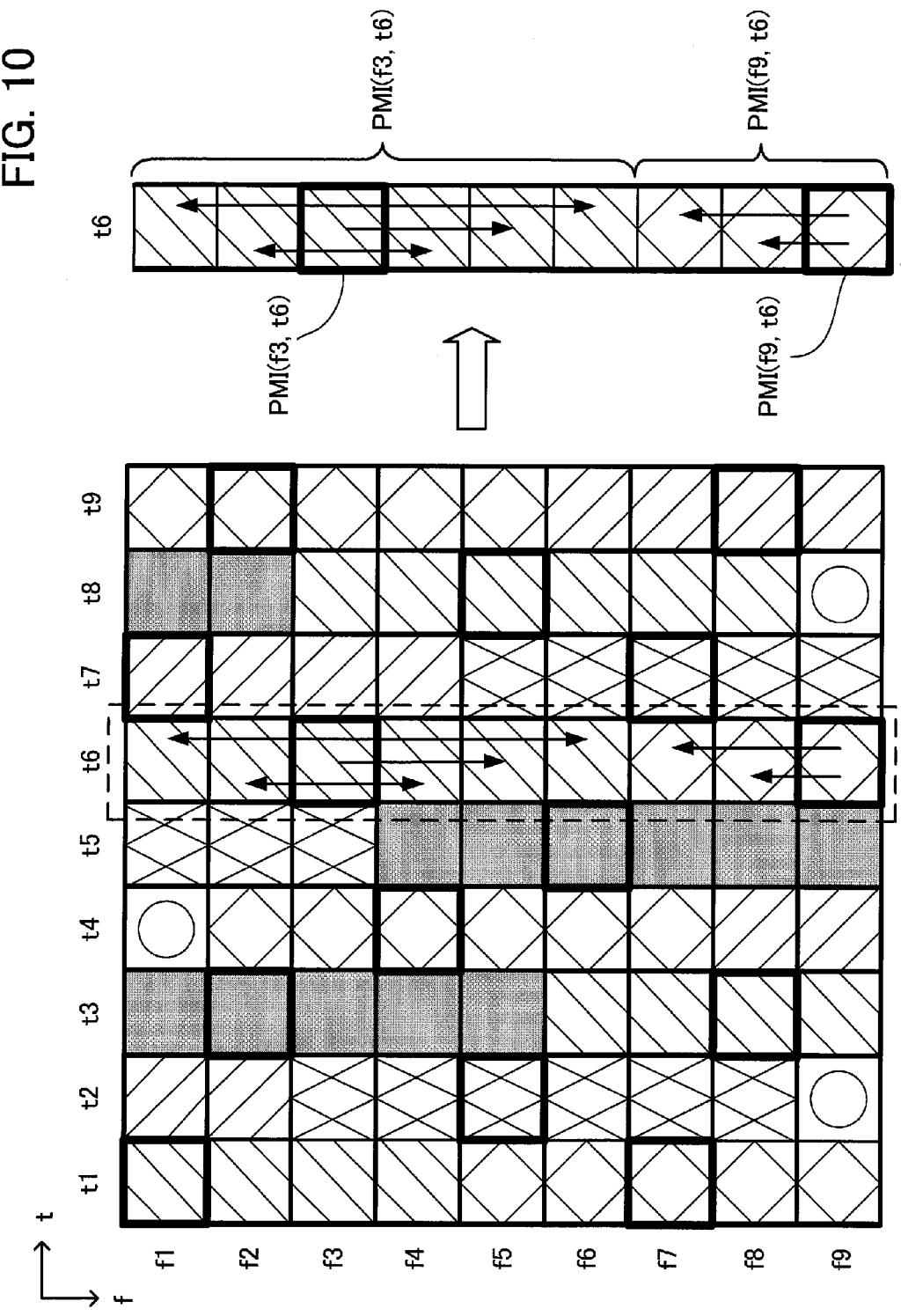
FIG. 10 illustrates another example of the PMI interpolation processing.

(2) PMI Interpolation According to an Interpolation Rule Based on the Correlation in the Same Period of Time FIG. 10 illustrates another example of the PMI interpolation processing. In FIG. 10, cells each surrounded by a black border represent resource blocks whose PMIs are fed back. Cells with an identical pattern represent resource blocks for which the same PMI is fed back. It is considered here to obtain PMIs for the entire resource blocks in the time t6, which is indicated by the dotted frame in FIG. 10. According to an interpolation rule based on the correlation in the same period of time, a PMI interpolation for each resource block for which a PMI is not fed back is achieved by searching resource blocks in the same period of time for a nearest neighbor resource block whose PMI is fed back and using the PMI of the nearest neighbor resource block for the interpolation.

Assume here that in a resource block column of the time t6, PMI(f3, t6) of the resource block rb(f3, t6) and PMI(f9, t6) of the resource block rb(f9, t6) are fed back, and PMIs of the remaining resource blocks are not fed back. In this case, for the resource blocks rb(f1, t6), rb(f2, t6), rb(f4, t6), rb(f5, t6), and rb(f6, t6), the nearest neighbor resource block whose PMI is fed back is the resource block rb(f3, t6). Accordingly, the PMIs of the individual resource blocks rb(f1, t6), rb(f2, t6), rb(f4, t6), rb(f5, t6), and rb(f6, t6) are all interpolated with the PMI(f3, t6). Similarly, for resource blocks rb(f7, t6) and rb(f8, t6), the nearest neighbor resource block whose PMI is fed back is the resource block rb(f9, t6). Accordingly, the PMIs of the individual resource blocks rb(f7, t6) and rb(f8, t6) are interpolated with PMI(f9, t6).

In the case where the channel delay spread is small, the channel condition exhibits relatively small changes in the frequency direction, and therefore PMIs have strong correlations in the same period of time. Accordingly, in the case where the channel delay spread between the wireless base station 10a and the mobile station 20a is small, it is effective to apply an interpolation rule based on the correlation in the same period of time as described above.

Figure 11:
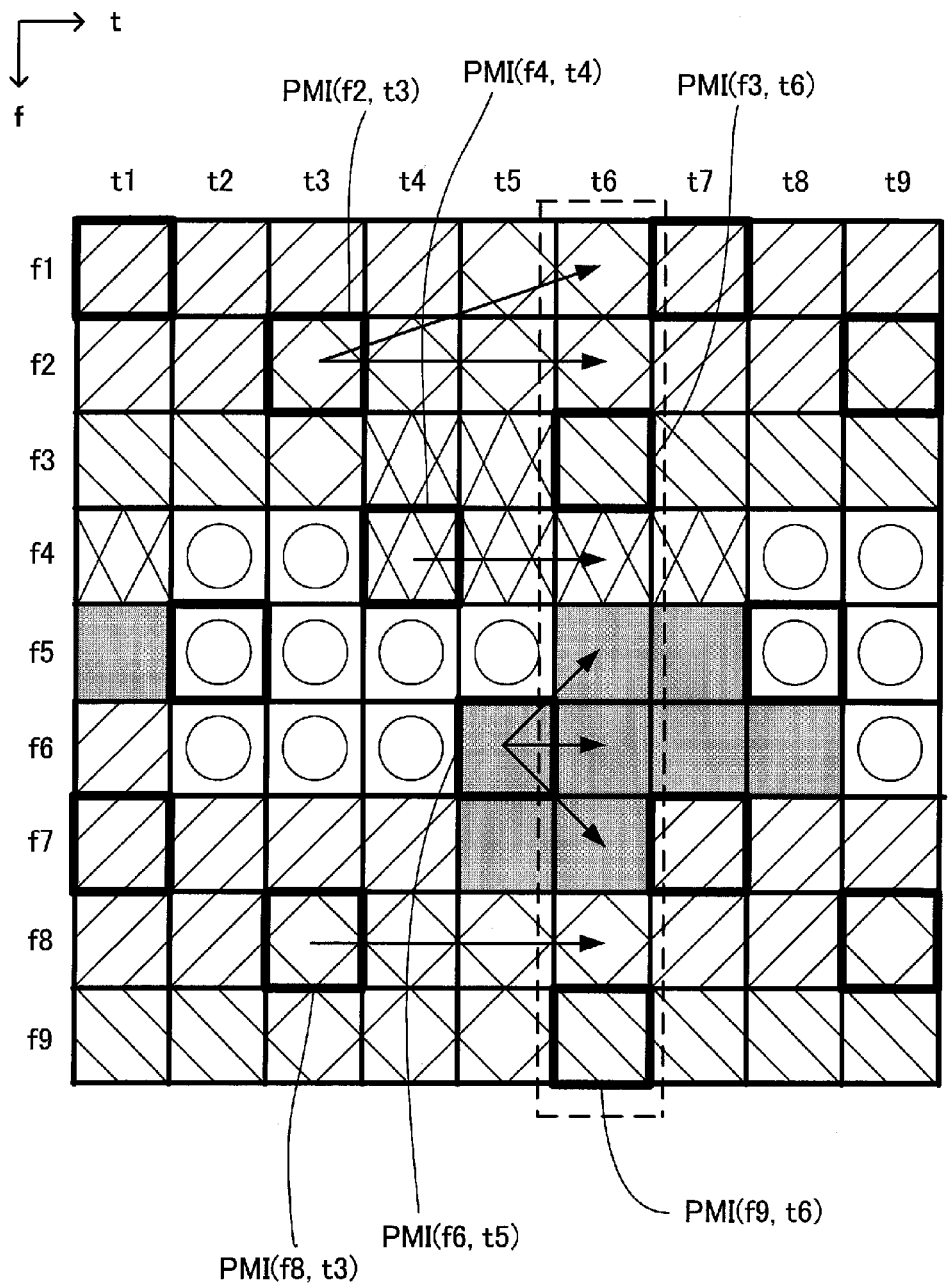
FIG. 11 illustrates yet another example of the PMI interpolation processing.

(3) PMI Interpolation According to an Interpolation Rule Based on the Correlation of Proximity FIG. 11 illustrates yet another example of the PMI interpolation processing. In FIG. 11, cells each surrounded by a black border represent resource blocks whose PMIs are fed back. Cells with an identical pattern represent resource blocks for which the same PMI is fed back. It is considered here to obtain PMIs for the entire resource blocks in the time t6, which is indicated by the dotted frame in FIG. 11. According to an interpolation rule based on the correlation of proximity, a PMI interpolation for each resource block for which a PMI is not fed back is achieved by searching adjacent neighboring resource blocks and using the PMI of a resource block having the highest priority among resource blocks for which PMIs are fed back. In order to find the resource block having the highest priority, a priority-order set map in which priority is assigned beforehand is used.

Figure 12:
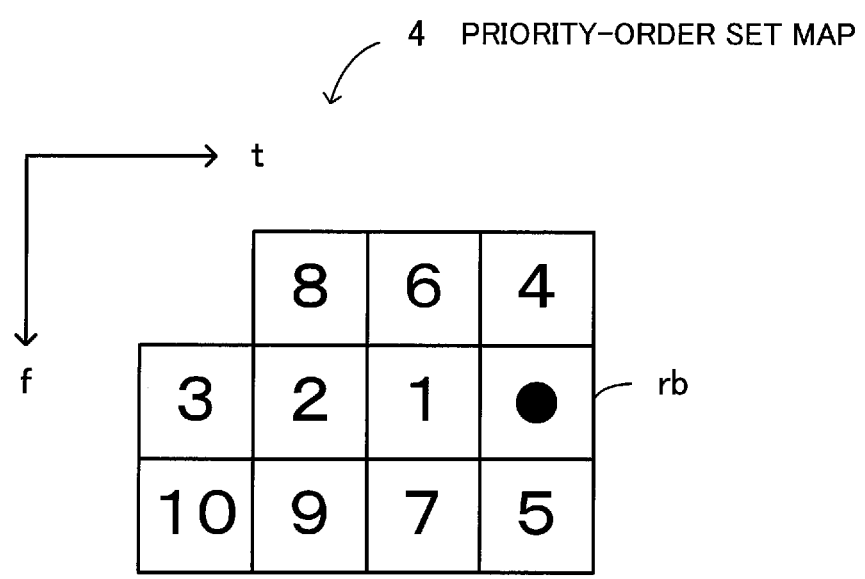
FIG. 12 illustrates a priority-order setting map.

FIG. 12 illustrates an example of the priority-order set map. A priority-order set map 4 indicates a priority order for searching neighboring resource blocks which are located around each resource block for which a PMI is not fed back. The priority-order set map 4 is shared between the wireless base station 10a and the mobile station 20a. In FIG. 12, a resource block rb represents one for which a PMI is not fed back. Numbers in FIG. 12 indicate a priority order for resource block searching (i.e., search order), and a resource block with a smaller number has a higher priority. A resource block having the $n^{th}$ priority is expressed as "resource block (n)", and a PMI fed back for the resource block (n) is expressed as "PMI(n)".

In the case of interpolating a PMI of the resource block rb (hereinafter, "PMIrb"), a resource block (1) having the highest priority is searched first, and it is determined whether PMI(1) has been fed back for the resource block (1). If PMI(1) has been fed back for the resource block (1), PMIrb of the resource block rb is interpolated with PMI(1). If PMI(1) is not fed back for the resource block (1), a resource block (2) having the second highest priority is searched next, and it is determined whether PMI(2) has been fed back for the resource block (2). If PMI(2) has been fed back for the resource block (2), PMIrb of the resource block rb is interpolated with PMI(2). If PMI(2) is not fed back for the resource block (2), a resource block (3) having the third priority is searched next. The same operation process is subsequently repeated if necessary.

The interpolation processing is described specifically below with an example in which the priority-order set map 4 of FIG. 12 is applied to FIG. 11. The PMI of the resource block rb(f1, t6) is interpolated with PMI(f2, t3) of the resource block rb(f2, t3) having the tenth priority. The PMI of the resource block rb(f2, t6) is interpolated with PMI(f2, t3) of the resource block rb(f2, t3) having the third priority. The PMI of the resource block rb(f4, t6) is interpolated with PMI(f4, t4) of the resource block rb(f4, t4) having the second priority. The PMI of the resource block rb(f5, t6) is interpolated with PMI(f6, t5) of the resource block rb(f6, t5) having the seventh priority. The PMI of the resource block rb(f6, t6) is interpolated with PMI(f6, t5) of the resource block rb(f6, t5) having the first priority. The PMI of the resource block rb(f7, t6) is interpolated with PMI(f6, t5) of the resource block rb(f6, t5) having the sixth priority. The PMI of the resource block rb(f8, t6) is interpolated with PMI(f8, t3) of the resource block rb(f8, t3) having the third priority.

In the case where, due to the channel condition, there are differences in the magnitude of the correlation of PMIs of neighboring resource blocks, and therefore, proximity is considered in terms of the correlations in both the time and frequency directions, it is effective to perform the interpolation processing using the priority-order set map 4 for preferentially searching for a resource block having a strong correlation, as described above. For the priority-order set map 4, many different variations may be considered depending on whether more importance is given to the correlation in the time direction or the correlation in the frequency direction.

Next described is interpolation rule switching control. The wireless base station 10a estimates changes in the channel condition using fed-back PMIs. For example, the wireless base station 10a estimates the magnitude of the change in the channel condition in the time direction, or the magnitude of the change in the channel condition in the frequency direction. The mobile station 20a estimates changes in the channel condition at the time of estimating an optimum PMI for each resource block. Subsequently, both the wireless base station 10a and the mobile station 20a individually switch an interpolation rule adaptively based on the estimated channel condition, to thereby share the optimum interpolation rule therebetween.

Here, one could argue that changes in the channel condition are small when, in the wireless base station 10a, the same fed-back PMI appears in the time direction or the frequency direction successively, and that changes in the channel condition are significant when the same PMI does not successively appear in the feedback. Accordingly, a PMI average successive count (index value average successive count), which is the number of times identical PMIs successively appear, may be obtained in each of the time direction and the frequency direction, and used as an index of the changes in the channel condition. Each PMI average successive count indicates an average length of a section in which identical PMIs appear successively in the time direction or the frequency direction. In order to obtain the PMI average successive count, the total number of PMI successive blocks and the total number of PMIs included in the PMI successive blocks are counted and then substituted into Equation (12) below. Note that "PMI successive blocks" in Equation (12) means sectional blocks, each of which is a series of resource blocks with successive appearance of identical PMIs.

PMI average successive count=(Total number of PMIs in PMI successive blocks)/(Total number of PMI successive blocks)  (12)

Figure 13:
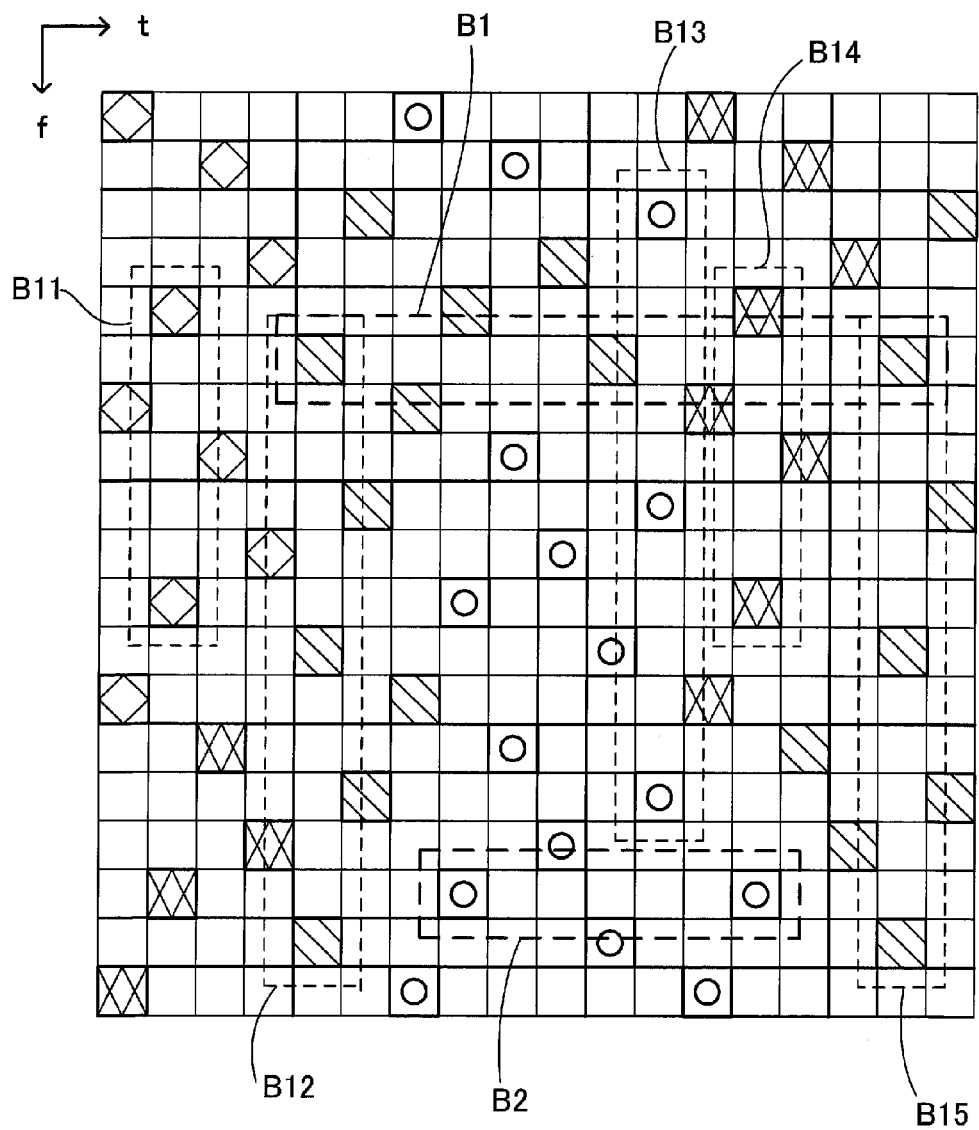
FIG. 13 is a diagram for illustrating PMI average successive counts.

FIG. 13 is a diagram for illustrating PMI average successive counts. Here, a PMI average successive count in the time direction is considered first. In the time direction, each of blocks B1 and B2, for example, includes identical PMIs appearing successively in a single frequency. Specifically, the block B1 includes three identical fed-back PMIs, and the block B2 includes two identical fed-back PMIs. In this case, the total number of PMI successive blocks in Equation (12) is 2 because of the two blocks B1 and B2. In addition, since the block B1 includes three identical PMIs and the block B2 includes two identical PMIs, the total number of PMIs in PMI successive blocks is 3+2=5. Accordingly, the PMI average successive count is 5/2=2.5, and it may therefore be said that, with respect to the blocks B1 and B2, 2.5 identical PMIs appear successively in the time direction.

Next considered is a PMI average successive count in the frequency direction. In the frequency direction, each of blocks B11 to B15, for example, includes identical PMIs appearing successively in a single period of time. Specifically, the block B11 includes two identical fed-back PMIs. The block B12 includes three identical fed-back PMIs, the block B13 includes three identical fed-back PMIs, the block B14 includes two identical fed-back PMIs, and the block B15 includes three identical fed-back PMIs. In this case, the total number of PMI successive blocks in Equation (12) is 5 because of the five blocks B11 to B15. In addition, since the blocks B11 to B15 include two, three, three, two, and three identical PMIs, respectively, the total number of PMIs in PMI successive blocks is 2+3+3+2+3=13. Accordingly, the PMI average successive count is 13/5=2.6, and it may therefore be said that, with respect to the blocks B11 and B15, 2.6 identical PMIs appears successively in the frequency direction.

Note that, among fed-back PMIs, the range of PMIs to be used to obtain the PMI average successive count is determined arbitrarily. For example, in the case of obtaining the PMI average successive count for a hundred sub-frames, PMIs fed back between the $103^{rd}$ previous sub-frame and the $4^{th}$ previous sub-frame are used. Note however that PMIs for a hundred sub-frames are not available until the $103^{rd}$ sub-frame after the communication is started. In this case, PMIs fed between the $1^{st}$ sub-frame and the $4^{th}$ previous sub-frame are used.

Using the PMI average successive count in the time direction and the PMI average successive count in the frequency direction as obtained above, it is decided to use one of the above-described multiple interpolation rules, that is, the interpolation rule based on the correlation of PMIs in the same frequency; the interpolation rule based on the correlation of PMIs in the same period of time; and the interpolation rule based on the correlation of proximity with the use of the priority-order set map.

Figure 14:
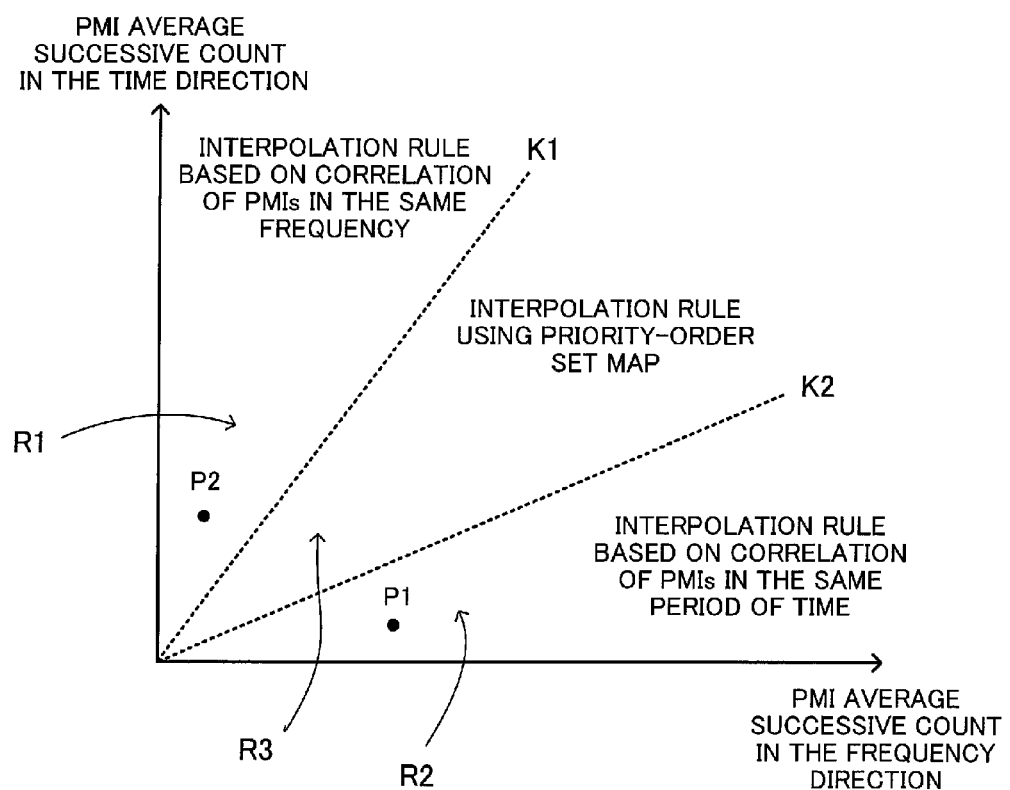
FIG. 14 illustrates a relationship between PMI average successive counts and interpolation rules.

FIG. 14 illustrates the relationship between the PMI average successive counts and the interpolation rules. The vertical axis represents the PMI average successive count in the time direction, and the horizontal axis represents the PMI average successive count in the frequency direction. If a coordinate point specified by the PMI average successive counts in the time and frequency directions, which are calculated using Equation (12), falls within a region R1 located between the vertical axis and a threshold curve K1, the interpolation rule based on the correlation of PMIs in the same frequency is used.

If the coordinate point falls within a region R2 located between the horizontal axis and a threshold curve K2, the interpolation rule based on the correlation of PMIs in the same period of time is used. If the coordinate point falls within a region R3 located between the threshold curves K1 and K2, the interpolation rule taking account of the correlation of proximity and using the priority-order set map 4 is used.

Note that the threshold curves K1 and K2 may be determined by running a simulation in which various channel conditions are set. The simulation is run to obtain an optimum interpolation rule for each channel condition. By the simulation, for example, the interpolation rule based on the correlation of PMIs in the same period of time is determined to be optimum when the coordinate point representing the channel condition is located at P1 in FIG. 14, and the interpolation rule based on the correlation of PMIs in the same frequency is determined to be optimum when the coordinate point representing the channel condition is located at P2. Subsequently, based on the simulation result, the threshold curves K1 and K2 used as boundaries of the interpolation rules are determined.

The PMI average successive counts are calculated above in order to estimate the channel condition. However, for the estimation of the channel condition, a PMI successive count appearing most frequently (most frequent index-value successive count) may be calculated instead. Specifically, in each of the time and frequency directions, the count of PMI successive blocks is determined with respect to each PMI successive count. Then, the largest count of PMI successive blocks with a specific PMI successive count (which means the PMI successive count appears most frequently) is found, and the PMI successive count is used as an index value of the changes in the channel condition.

Assume here that, in the time direction, there are five PMI successive blocks in which the same PMI appears successively three times, ten PMI successive blocks in which the same PMI appears successively four times, and eight PMI successive blocks in which the same PMI appears successively five times. Among the count values of 5, 10, and 8, the largest count value is 10, and the PMI successive count of the count value is four. That is, the PMI successive blocks with a PMI successive count of 4 have the highest frequency of appearance, and therefore, the value of the PMI successive count is used as an index of the changes in the channel condition. The same calculation process is performed for the frequency direction.

Thus, switching of an interpolation rule may be performed using the most frequent PMI successive counts in place of the PMI average successive counts. In this case, the vertical axis of the graph illustrated in FIG. 14 represents the most frequent PMI successive counts in the time direction, and the horizontal axis represents the most frequent PMI successive count in the frequency direction. The threshold curves K1 and K2 are obtained in a similar manner described above.

In the case where the PMI average successive count, or the most frequent PMI successive count, in the time direction is large, the same PMI has successively appeared for a long period of time, and therefore, it is estimated that the channel variation in the time direction is small. In the case where the PMI average successive count, or the most frequent PMI successive count, in the time direction is small, PMIs have frequently changed over time, and therefore, it is estimated that the channel variation is significant in the time direction.

The same applies to the frequency direction. That is, in the case where the PMI average successive count, or the most frequent PMI successive count, in the frequency direction is large, the same PMI has successively appeared for a long period of time, and therefore, it is estimated that the channel variation in the frequency direction is small. In, the case where the PMI average successive count, or the most frequent PMI successive count, in the frequency direction is small, PMIs have frequently changed over time, and therefore, it is estimated that the channel variation is significant in the frequency direction.

Based on the channel condition obtained in the above-described manner, an optimum interpolation rule is selected. That is, in the case where the channel variation is not significant in the time direction but significant in the frequency direction, an interpolation rule with a focus on the time direction (i.e., the interpolation rule based on the correlation of PMIs in the same frequency) is applied. In the case where the channel variation is not significant in the frequency direction but significant in the time direction, an interpolation rule with a focus on the frequency direction (i.e., the interpolation rule based on the correlation of PMIs in the same period of time) is applied. Further, in the case where focus is placed on both the time direction and the frequency direction, the interpolation rule using the priority-order set map 4 is applied.

Next described is a case where there is an error in the uplink. When feeding back a PMI, the mobile station 20a performs an error correction encoding process (such as addition of cyclic redundancy check (CRC)) on the PMI and then transmits the PMI through the upstream data channel. Subsequently, the wireless base station 10a performs decoding and CRC to determine whether the PMI has been accurately received. In the case where there was an error in the uplink and the wireless base station 10a could not accurately receive the PMI, or in the case where the wireless base station 10a does not use the fed-back PMI, the wireless base station 10a performs precoding on transmission signals using a single PMI for an entire frequency band, rather than performing precoding using a single PMI with respect to each resource block. Then, the wireless base station 10a notifies the single PMI to the mobile station 20a. In the case where the wireless base station 10a decides not to use the fed-back PMI after estimating the channel condition, both the wireless base station 10a and the mobile station 20a reset the estimation because the channel condition is not accurately estimated. As a means of resetting the estimation, past PMIs stored to determine the PMI average successive counts or the most frequent PMI successive counts are cleared. In the above-cited case, PMIs for a hundred sub-frames are cleared. Subsequently, the channel condition estimation is performed using newly stored PMIs. The wireless base station 10a resets the estimation if an error is detected by the CRC on the PMI, and the mobile station 20a resets the estimation if a single PMI is notified. With this, it is possible that the wireless base station 10a and the mobile station 20a reset the channel condition estimations at the same time, thereby preventing a discrepancy therebetween.

Here, operations performed by the precoding unit 11 are summarized (1) to (7) as follows.

(1) The precoding unit 11 performs an interpolation based on a frequency-based interpolation rule. The frequency-based interpolation rule specifies to search past data blocks having the same frequency as that of a data block, for which an index value is not transmitted, for a data block transmitted most recently; and to interpolate the data block having no index value with the index value of the most recently transmitted data block.

(2) The precoding unit 11 performs an interpolation based on a time-based interpolation rule. The time-based interpolation rule specifies to search data blocks in the same period of time as a data block, for which an index value is not transmitted, for a nearest neighbor data block whose index value has been transmitted; and to interpolate the data block having no index value with the index value of the nearest neighbor data block.

(3) The precoding unit 11 performs an interpolation based on a proximity-based interpolation rule. The proximity-based interpolation rule specifies to use a priority-order set map which indicates a priority order for searching neighboring data blocks located around a data block, for which an index value is not transmitted; to search the neighboring data blocks for one or more data blocks whose index values have been transmitted, and then select, among the one or more data blocks, a data block having the highest priority; and to interpolate the data block having no index value with the index value of the data block having the highest priority.

(4) The precoding unit 11 and the index value control unit 21 individually estimate the transmitting and receiving channel condition. According to the channel condition estimated individually, the precoding unit 11 and the index value control unit 21 cause to change at least one of the index value transmission rule and the interpolation rule with respect to both the first wireless communication device and the second wireless communication device. With this, the first wireless communication device and the second wireless communication device share the same index value transmission rule or interpolation rule.

(5) In the case of estimating the channel condition between the transmitter and the receiver, the precoding unit 11 calculates a time-direction index value average successive count and a frequency-direction index value average successive count. The time-direction index value average successive count is obtained by dividing the total number of index values included in index value successive blocks in the time direction by the total number of the index value successive blocks in the time direction. The frequency-direction index value average successive count is obtained by dividing the total number of index values included in index value successive blocks in the frequency direction by the total number of the index value successive blocks in the frequency direction. Note that the index value successive blocks cited above are sectional blocks, each of which is a series of data blocks with successive appearance of the same transmitted index value. Subsequently, based on the time-direction index value average successive count and the frequency-direction index value average successive count, the precoding unit 11 estimates the magnitude of changes in the channel condition in both the time direction and the frequency direction, and performs switching of an interpolation rule according to the estimation result.

(6) In the case of estimating the transmitting and receiving channel condition, the precoding unit 11 calculates a time-direction most frequent index value successive count and a frequency-direction most frequent index value successive count. In order to obtain the time-direction most frequent index value successive count, in the time direction, the count of index value successive blocks is determined with respect to each index value successive count, and then, the largest count of index value successive blocks with a specific index value successive count is found. The index value successive count is used as the time-direction most frequent index value. Similarly, in order to obtain the frequency-direction most frequent index value successive count, in the frequency direction, the count of index value successive blocks is determined with respect to each index value successive count, and then, the largest count of index value successive blocks with a specific index value successive count is found. The index value successive count is used as the frequency-direction most frequent index value. Note that the index value successive blocks cited above are sectional blocks, each of which is a series of data blocks with successive appearance of the same transmitted index value. Subsequently, based on the time-direction most frequent index value successive count and the frequency-direction most frequent index value successive count, the precoding unit 11 estimates the magnitude of changes in the channel condition in both the time direction and the frequency direction, and perform switching of an interpolation rule according to the estimation result.

(7) In the case where the precoding unit 11 has not received a transmitted index value correctly, the precoding unit 11 resets a result of a channel condition estimation performed by a first wireless communication device, performs precoding on a transmission signal using a precoding matrix indicated by a single index value for an entire frequency band, and notifies a second wireless communication device of performing precoding using the single index value. When recognizing that precoding has been performed using the single index value, the index value control unit 21 resets a result of a channel condition estimation performed by the second wireless communication device.

Figure 15:
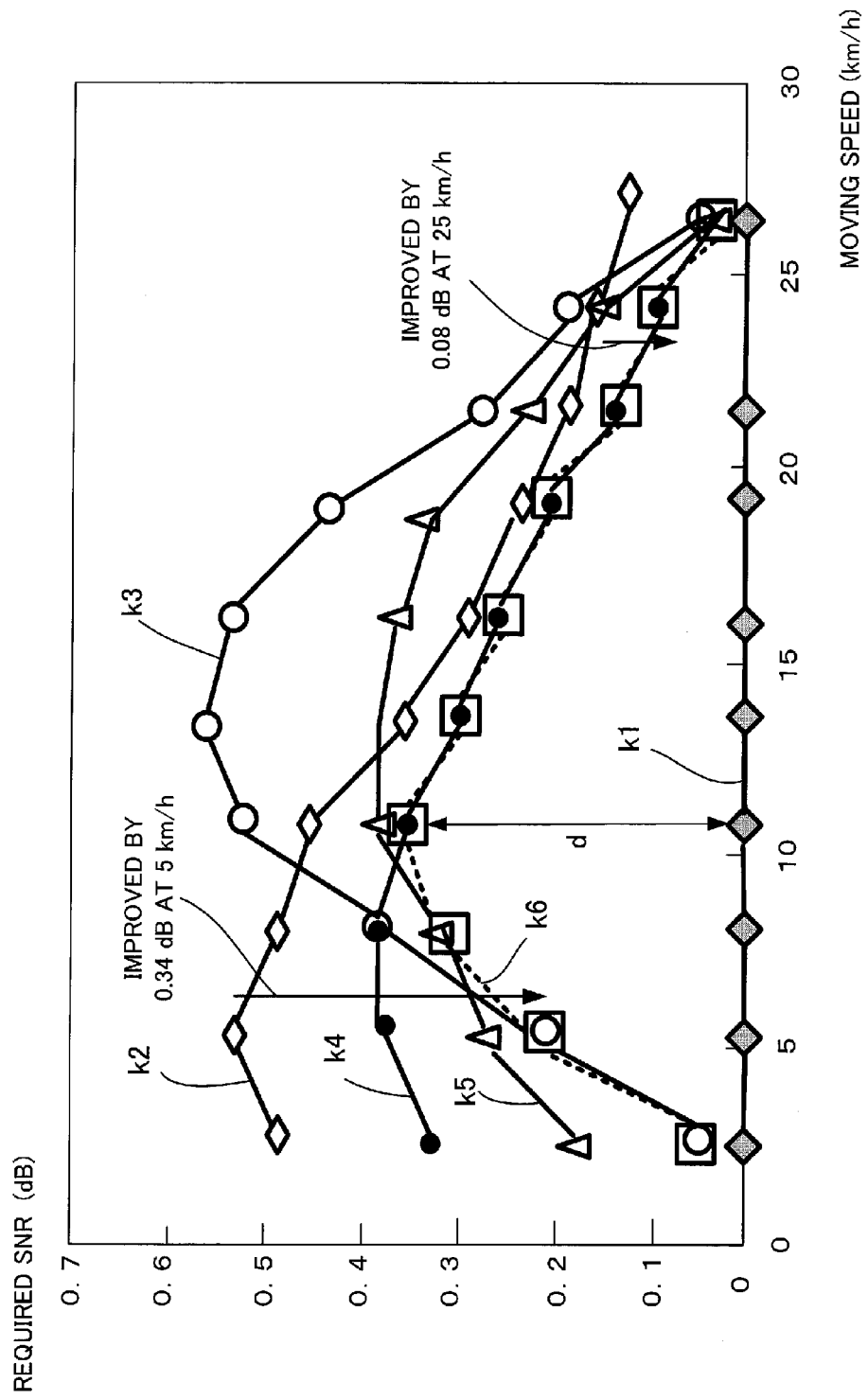
FIG. 15 illustrates simulation results.
Figure 16:
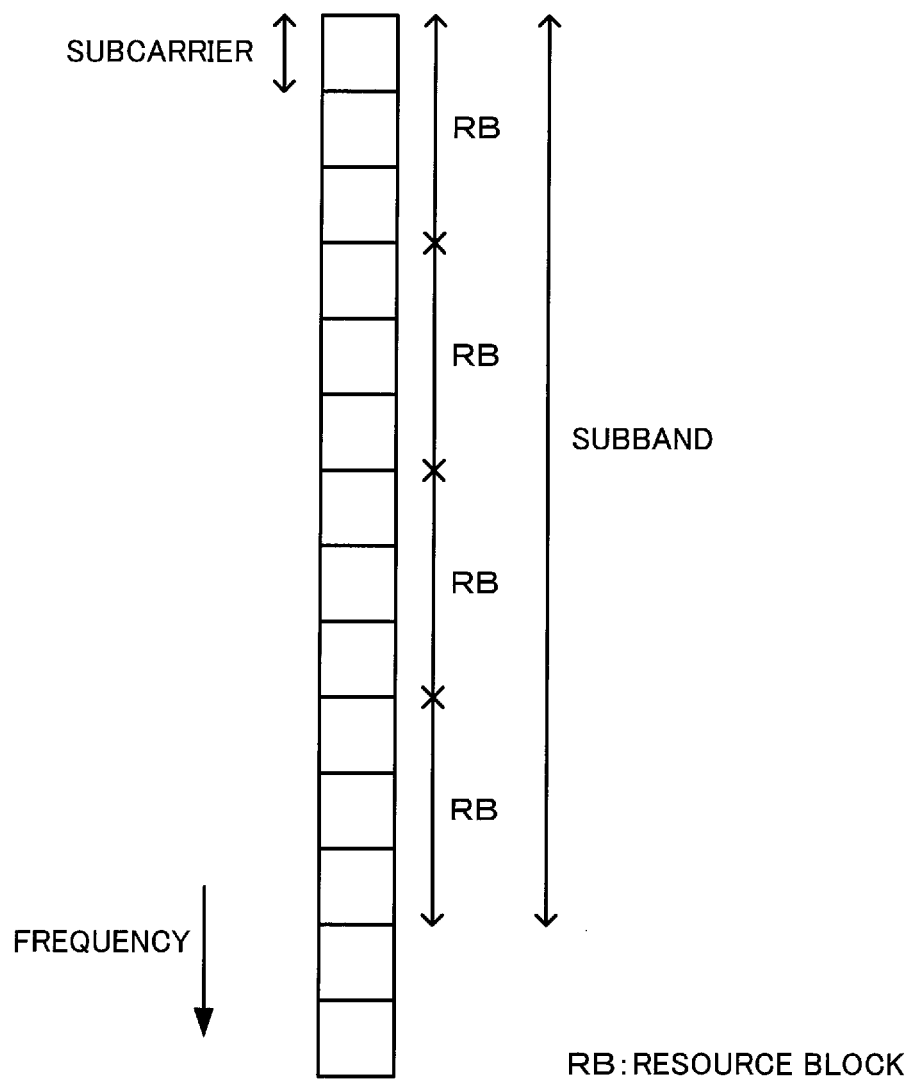
FIG. 16 illustrates a signal format.
Figure 17:
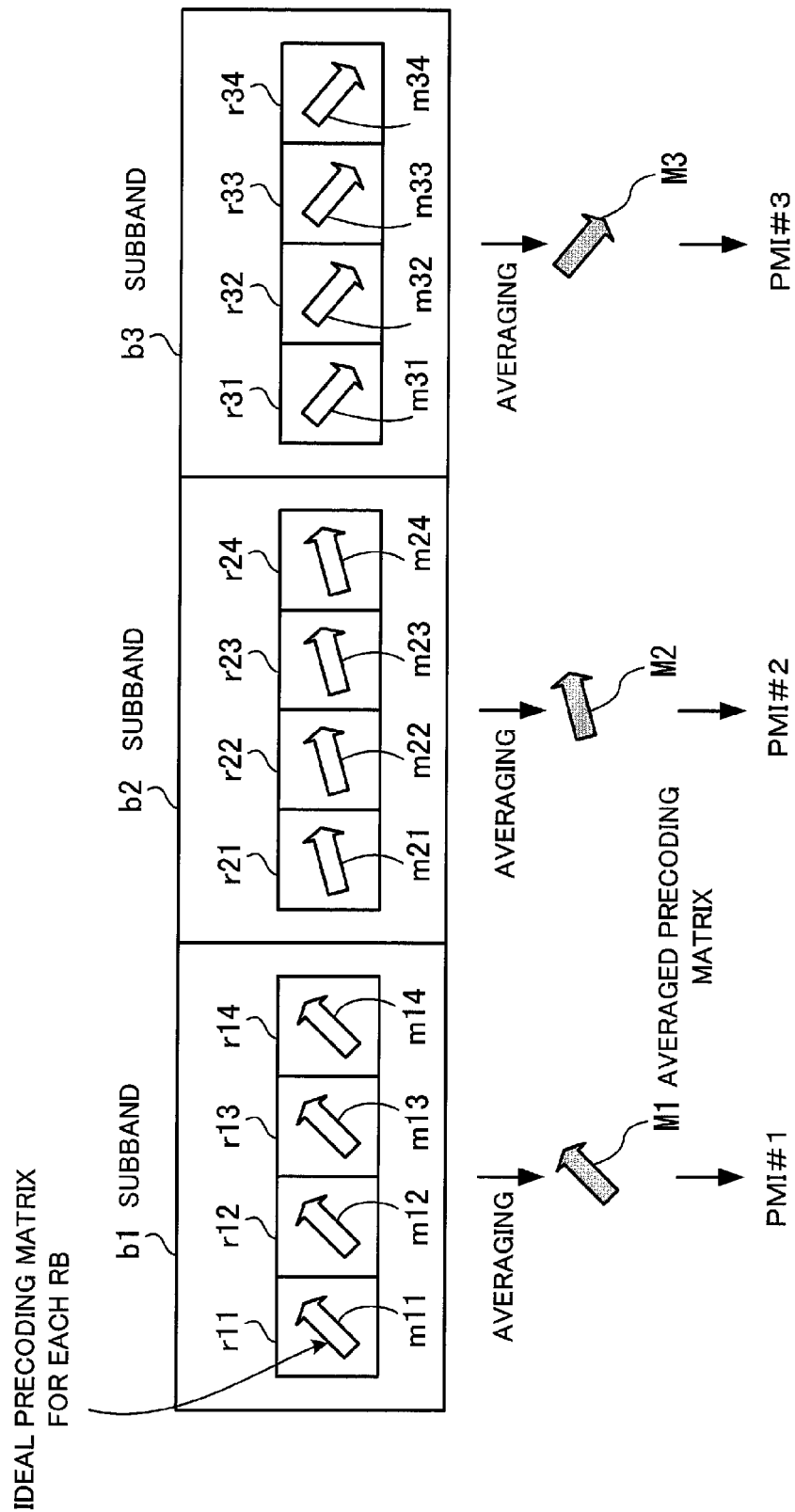
FIG. 17 illustrates an example of PMI feedback control.
Figure 18:
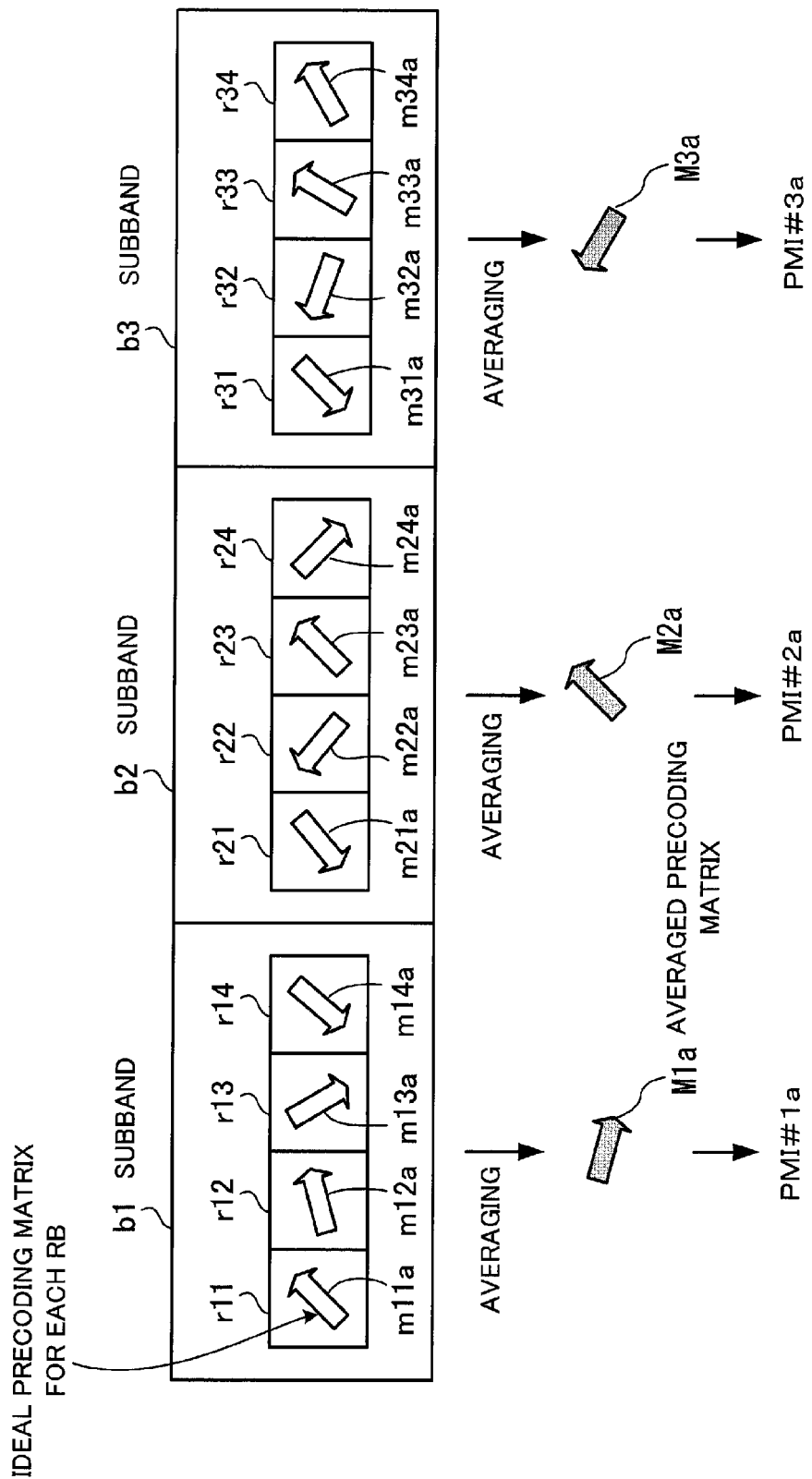
FIG. 18 illustrates another example of the PMI feedback control.

Next described are simulation results. FIG. 15 illustrates simulation results. In FIG. 15, signal to noise ratios (SNR) required to provide a block error rate (BLER) of 0.1 are compared by a simulation. The vertical axis represents the required SNR (dB). The SNR of precoding performed when a PMI is fed back with respect to each resource block is used as the baseline (i.e., 0 dB), and FIG. 15 illustrates differences between the baseline SNR and SNRs of precoding performed in different manners. The horizontal axis represents the moving speed (km/h) of a mobile station.

A curve k1 represents the SNR of precoding performed when a PMI is fed back with respect to each resource block. A curve k2 represents the SNR of precoding performed when a PMI is fed back with respect to each sub-band. A curve k3 represents the SNR of precoding according to the interpolation rule based on the correlation of PMIs in the same frequency. A curve k4 represents the SNR of precoding according to the interpolation rule based on the correlation of PMIs in the same period of time. A curve k5 represents the SNR of precoding according to the interpolation rule using the priority-order set map 4. A curve k6 represents the SNR obtained when precoding is performed by adaptively switching an interpolation rule among the above-cited three interpolation rules according to the result of the channel condition estimation.

Among the curves k1 to k6, the curve k1 exhibits the best performance since the curve k1 is the SNR of precoding performed when a PMI is fed back with respect to each resource block. Therefore, each of the remaining curves k2 to k6 has better performance if a SNR difference d of the curve from the curve k1 is smaller, that is, if the curve is located closer to the curve k1. It may be seen from FIG. 15 that the curve k6, which represents the SNR obtained when precoding is performed by adaptively switching an interpolation rule, has the smallest SNR difference d from the curve k1, thereby having the best performance among the curves k2 to k6.

The PMI feedback control by adaptively switching an interpolation rule according to the present embodiment (curve k6) is compared to the conventional PMI feedback control with respect to each sub-band (curve k2). In the case where the moving speed is 5 km/h, the curve k6 exhibits an improvement of 0.34 dB without an increase in the amount of feedback compared to the curve k2. Further, in the case where the moving speed is 25 km/h, the curve k6 exhibits an improvement of 0.08 dB without an increase in the amount of feedback compared to the curve k2. Thus, it is possible to enhance the effect of precoding and thus improve the reception performance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A wireless communication apparatus comprising:
    an index value control unit configured to transmit, to a different wireless communication apparatus, one or more index values which indicate one or more precoding matrices to be used for precoding performed by the different wireless communication apparatus; and
    a deprecoding unit configured to perform deprecoding using precoding matrices corresponding to the one or more index values transmitted by the index value control unit in past, wherein the index value control unit transmits, to the different wireless communication apparatus at each transmission timing, index values generated based on a result of a channel condition measurement for entire or some of sub-frequency bands belonging to a predetermined frequency band, a count of the index values transmitted to the different wireless communication apparatus being less than a count, N, of the entire sub-frequency bands belonging to the predetermined frequency band, and the deprecoding unit selects, from the one or more index values transmitted by the index value control unit in the past, an index value to be applied to a data block for which no index value is transmitted, according to a time or a frequency of the data block for which no index value is transmitted, and performs deprecoding for the data block for which no index value is transmitted, using the selected index value, and wherein the index value control unit transmits index values to the wireless communication apparatus in a discontinuous manner so that index values corresponding to some data blocks are transmitted but index values corresponding to other data blocks are not transmitted, rather than transmitting index values corresponding to all data blocks in a continuous manner.

2. The wireless communication apparatus according to claim 1, wherein the index value control unit transmits, to the different wireless communication apparatus at each transmission timing, index values generated based on a result of a channel condition measurement for two or more sub-frequency bands belonging to the predetermined frequency band, using a sub-frequency band belonging to the predetermined frequency band.

3. The wireless communication apparatus according to claim 1, wherein the index value control unit transmits, to the different wireless communication apparatus at each transmission timing, index values generated based on a result of a channel condition measurement for two or more sub-frequency bands belonging to the predetermined frequency band, using one of the entire sub-frequency bands belonging to the predetermined frequency band, the one of the entire sub-frequency bands being sequentially shifted.

4. The wireless communication apparatus according to claim 1, wherein the index value control unit transmits, to the different wireless communication apparatus at each transmission timing, an index value generated based on a result of a channel condition measurement for one sub-frequency band belonging to the predetermined frequency band, using the one sub-frequency band.

5. The wireless communication apparatus according to claim 1, wherein the index value control unit transmits, to the different wireless communication apparatus at each transmission timing, an index value generated based on a result of a channel condition measurement for one sub-frequency band belonging to the predetermined frequency band, using one of the entire sub-frequency bands belonging to the predetermined frequency band, the one of the entire sub-frequency bands being sequentially shifted.

6. The wireless communication apparatus according to claim 1, wherein the index value control unit resets the result of the channel condition measurement in a case of receiving, from the different wireless communication apparatus, a notification indicating that precoding is performed using a single index value.

7. A communication method performed by a wireless communication apparatus, comprising:

generating one or more index values which indicate one or more precoding matrices to be used for precoding performed by a different wireless communication apparatus, based on a result of a channel condition measurement for entire or some of sub-frequency bands belonging to a predetermined frequency band;

transmitting the index values to the different wireless communication apparatus at each transmission timing; and selecting, from the index values transmitted in the past, an index value to be applied to a data block for which no index value is transmitted, according to a time or a frequency of the data block for which no index value is transmitted, and performing deprecoding for the data block for which no index value is transmitted, using the selected index value, wherein a count of the index values transmitted to the different wireless communication apparatus is less than a count, N, of the entire sub-frequency bands belonging to the predetermined frequency band, and wherein the index values are transmitted to the wireless communication apparatus in a discontinuous manner so that index values corresponding to some data blocks are transmitted but index values corresponding to other data blocks are not transmitted, rather than transmitting index values corresponding to all data blocks in a continuous manner.

8. A wireless communication apparatus including:

a data block generator configured to generate data bocks by performing encoding on bit sequences to be transmitted and by modulating the encoded bit sequences using a predetermined modulation scheme, and a precoding unit configured to perform precoding with respect to individual data blocks to be transmitted, using precoding matrices corresponding to received index values, wherein the precoding unit selects, from the received index values, an index value to be applied to a data block for which no index value is received, according to a time or a frequency of the data block, and performs precoding for the data block, using the selected index value, wherein as the index value to be applied to the data block, the precoding unit selects, from one or more index values received for a sub-frequency band to which the data block belongs, an index value received most recently before the data block.

9. The wireless communication apparatus according to claim 8, wherein in a case where there are two index values which are respectively received on different frequency bands in a time period to which the data block belongs, the precoding unit selects, from the two index values, one index value having a frequency band closer to a frequency band of the data block as the index value to be applied to the data block.

10. The wireless communication apparatus according to claim 8, wherein the precoding unit uses a priority-order set map, which indicates a priority order for searching neighboring data blocks around the data block, to search the neighboring data blocks for a data block having highest priority among one or more data blocks for which index values are transmitted, and selects an index value of the data block having highest priority as the index value to be applied to the data block.

11. The wireless communication apparatus according to claim 8, wherein
the precoding unit selects the index value to be applied to the data block, according to one of a plurality of interpolation rules.

12. The wireless communication apparatus according to claim 11, wherein
in a case of estimating a channel condition between a transmitter and a receiver, the precoding unit:
calculates a time-direction index value average successive count by dividing a total number of index values included in index value successive blocks in a time direction by a total number of the index value successive blocks in the time direction;
calculates a frequency-direction index value average successive count by dividing a total number of index values included in index value successive blocks in a frequency direction by a total number of the index value successive blocks in the frequency direction; and
estimates, based on the time-direction index value average successive count and the frequency-direction index value average successive count, a magnitude of changes in the channel condition in both the time direction and the frequency direction, and performs switching to one of the interpolation rules according to a result of the estimation.

13. The wireless communication apparatus according to claim 11, wherein
in a case of estimating a channel condition between a transmitter and a receiver, the precoding unit:
calculates a time-direction most frequent index value successive count by determining, in a time direction, a count of index value successive blocks with respect to each index value successive count, and obtaining a largest count of index value successive blocks with a specific index value successive count, the specific index value successive count being used as the time-direction most frequent index value;
calculates a frequency-direction most frequent index value successive count by determining, in a frequency direction, a count of index value successive blocks with respect to each index value successive count, and obtaining a largest count of index value successive blocks with a specific index value successive count, the specific index value successive count being used as the frequency-direction most frequent index value; and
estimates, based on the time-direction most frequent index value successive count and the frequency-direction most frequent index value successive count, a magnitude of changes in the channel condition in both the time direction and the frequency direction, and performs switching to one of the interpolation rules according to a result of the estimation.

14. The wireless communication apparatus according to claim 8, wherein
in a case where the precoding unit has not received a transmitted index value correctly, the precoding unit:
resets a result of a channel condition estimation;
performs precoding on a transmission signal using a precoding matrix indicated by a single index value for an entire frequency band; and
notifies a different wireless communication apparatus in communication of performing precoding using the single index value.

15. A wireless communication method performed by a precoding unit in a wireless communication apparatus, comprising:
receiving index values corresponding to precoding matrices used for precoding with respect to individual data blocks to be transmitted,
selecting, from the received index values, an index value to be applied to a data block for which no index value is received, according to a time or a frequency of the data block, and
performing precoding for the data block, using the selected index value,
wherein
as the index value to be applied to the data block, the precoding unit selects, from one or more index values received for a sub-frequency band to which the data block belongs, an index value received most recently before the data block.

* * * * *